US008774559B2

(12) United States Patent
Segall

(10) Patent No.: US 8,774,559 B2
(45) Date of Patent: Jul. 8, 2014

(54) STEREOSCOPIC DYNAMIC RANGE IMAGE SEQUENCE

(75) Inventor: Christopher A. Segall, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 340 days.

(21) Appl. No.: 13/285,819

(22) Filed: Oct. 31, 2011

(65) Prior Publication Data
US 2012/0050474 A1 Mar. 1, 2012

Related U.S. Application Data

(63) Continuation-in-part of application No. 12/356,074, filed on Jan. 19, 2009, now Pat. No. 8,406,569.

(51) Int. Cl.
G06K 9/00 (2006.01)
G06K 9/32 (2006.01)
H04N 13/00 (2006.01)
H04N 9/64 (2006.01)

(52) U.S. Cl.
USPC ............. 382/294; 348/43; 348/242; 382/154

(58) Field of Classification Search
CPC ........... G06T 2207/20172; G06T 2207/10144; G06T 2207/20208
See application file for complete search history.

(56) References Cited

U.S. PATENT DOCUMENTS 6,343,156 B1    1/2002  Yamaguchi
6,593,970 B1 *  7/2003  Serizawa et al. ............. 348/362
6,864,916 B1 *  3/2005  Nayar et al. ................. 348/224.1
7,149,358 B2 * 12/2006  Langan ........................ 382/214
7,760,949 B2 *  7/2010  Segall .......................... 382/232

(Continued)

FOREIGN PATENT DOCUMENTS

JP    2007-142670 A    6/2007
JP    2007-201985 A    8/2007
JP    2009-224901 A   10/2009

OTHER PUBLICATIONS

Troccoli, A.; Sing Bing Kang; Seitz, S., "Multi-View Multi-Exposure Stereo," 3D Data Processing, Visualization, and Transmission, Third International Symposium on , vol., No., pp. 861,868, Jun. 14-16, 2006.*

(Continued)

Primary Examiner — Andrae S Allison
(74) Attorney, Agent, or Firm — Chernoff Vilhauer McClung & Stenzel, LLP

(57) ABSTRACT

A system for decoding a video sequence includes a first sequence of images corresponding to a first image acquisition device of a stereoscopic pair of image acquisition devices and a second sequence of images corresponding to another image acquisition device of the stereoscopic pair of image acquisition devices, wherein at least one of the images of at least one of the sequence of images and the second sequence of images has an exposure different than the exposure of other images. A high dynamic range image sequence is created, having a dynamic range greater than the dynamic range of the first sequence and the second sequence, based upon at least one of the first sequence of images and the second sequence of images together with at least one of the images of at least one of the first sequence of images and the second sequence of images having exposure different than the exposure of other images.

7 Claims, 14 Drawing Sheets

(56) References Cited

U.S. PATENT DOCUMENTS

| | | | |
|---|---|---|---|
| 2005/0047676 A1* | 3/2005 | Kang et al. | 382/274 |
| 2006/0215762 A1 | 9/2006 | Han | |
| 2007/0076957 A1 | 4/2007 | Wang | |
| 2007/0147504 A1 | 6/2007 | Wang | |
| 2007/0242900 A1* | 10/2007 | Chen et al. | 382/294 |
| 2008/0056376 A1 | 3/2008 | Bjontegaard | |
| 2008/0094472 A1 | 4/2008 | Ayer | |
| 2008/0218635 A1 | 9/2008 | Tsuruoka | |
| 2010/0026809 A1* | 2/2010 | Curry | 348/157 |
| 2010/0142790 A1* | 6/2010 | Chang | 382/132 |

OTHER PUBLICATIONS

Ning Sun; Mansour, H.; Ward, R., "HDR image construction from multi-exposed stereo LDR images," Image Processing (ICIP), 2010 17th IEEE International Conference on , vol., No., pp. 2973,2976, Sep. 26-29, 2010.*

International Search Report, mailed Apr. 13, 2010, International Patent App. No. PCT/JP2010/050864, Sharp Kabushiki Kaisha, 4 pp.

Japanese Office Action, dated Sep. 24, 2012, for Japanese Patent App. No. 2011-545996, Sharp Kabushiki Kaisha, 3 pp.

English Translation of Japanese Office Action, dated Sep. 24, 2012, for Japanese Patent App. No. 2011-545996, Sharp Kabushiki Kaisha, 3 pp.

Chinese Office Action for Chinese Patent App. No. 201080004654.1, Sharp Kabushiki Kaisha, dated Oct. 23, 2013, 5 pgs.

English translation of Chinese Office Action for Chinese Patent App. No. 201080004654.1, Sharp Kabushiki Kaisha, dated Oct. 23, 2013, 3 pgs.

* cited by examiner

STEREOSCOPIC DYNAMIC RANGE IMAGE SEQUENCE

CROSS-REFERENCE TO RELATED APPLICATIONS

This application is a continuation-in-part of U.S. patent application Ser. No. 12/356,074, entitled Methods and Systems for Enhanced Dynamic Range Images and Video from Multiple Exposures" filed Jan. 19, 2009.

BACKGROUND OF THE INVENTION

Some embodiments of the present invention comprise methods and systems for capturing enhanced dynamic range images and video with sensors that are not capable of capturing the enhanced dynamic range with a single image capture. Some embodiments also relate to coding and decoding of video sequences.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
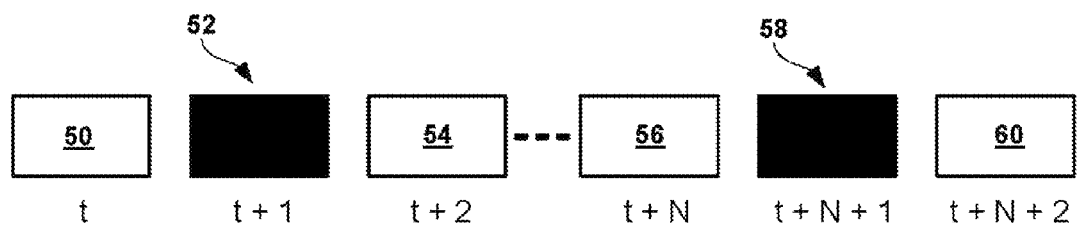
FIG. 1 is a diagram showing an exemplary series of reference frames and enhancement frames.

In general, the system may create enhanced dynamic range video using a capture device that obtains low-resolution images, limited frame rate images, and/or low dynamic range images. The camera may incorporate a controller which replaces a subset of auto-exposed frames with enhancement frames, which are exposed at different settings so as to capture information which is saturated in a base sequence. The temporal resolution of the enhancement frames may be relatively low compared to the standard frame rate (for example, around 1 FPS or less) and their exposure may be selected in real time by a controller, which may activate or deactivate their capture based on the amount of saturation in the other frames which are preferably obtained using auto-exposure.

The relatively low temporal frequency of the enhancement frames allows the auto-exposed sequence to be recovered with negligible visible quality degradation, by discarding the enhancement frames and performing an interpolation or other process to fill-in the missing frames. In addition, a fusion process described hereafter may be used to fuse the auto-exposured frames with the enhancement data, producing an enhanced dynamic range (EDR) sequence. This technique may be applied to still images, by capturing one or more enhancement frames together with the default auto-exposure, either manually or using an automated technique.

The system may create enhanced dynamic range video from low-quality and low frame-rate devices utilizing a base reference sequence, interleaved with a lower-frame-rate enhancement sequence. This technique may create a sequence which is similar and preferably of no lesser quality than the reference sequence, while utilizing the added information obtained from the enhancement frames.

These techniques facilitate the ability to abort the fusion technique and revert to the reference sequence when registration fails. The existence of a reference sequence also assists in maintaining consistent temporal illumination, which could result from fusing frames with varying exposure. The technique may include a registration process and an object motion detector, described in more detail below.

The fusion process may be based on a multi-scale decomposition which allows accumulation of the detail from all images. The boundary conditions, which emerge due to the global motion between the frames, may be considered in the fusion process. Pyramid construction typically employs boundary handling techniques, such as symmetric padding, along the image borders. The boundary handling is preferably extended to non-rectangular regions in a manner that does not result in disturbing artifacts.

A tone-mapping technique may be used to process the fusion results. The output of a multi-sensor fusion technique typically results in an extended dynamic range, and it is desirable to compress the results to adapt it to a lower dynamic range in such a manner that does not result in excessive loss of contrast.

The system may also include a generalized mis-registration detector that reduces fusion when object motion, registration errors, and/or other phenomena occur. A motion detector may be based on local image statistics without the need for a large number of frames. The mis-registration detector may be robust to exposure changes, and may operate over many scales to reduce phenomena from object motion to fine aliasing artifacts.

Algorithm Overview

Referring to FIG. 1, the system typically receives input in the form of a sequence of auto-exposure frames (A-frames) 50, 54, 56 & 60, periodically replaced by differently exposed enhancement frames (E-frames) 52 & 58. The sequence of frames may be low-resolution, compressed together with camera movement and object motion. The system typically includes two basic phases: a registration phase and a fusion phase. The registration phase may include global motion estimation, image warping, interpolation, and other processes. The system transforms the interleaved or multiplexed sequence of auto-exposures and enhancement exposures to a sequence of registered frame-sets, where each frame-set corresponds to a specific point in time and may include an auto-exposure frame and one or more aligned enhancement frames. The fusion phase fuses the frames to provide an EDR sequence. The fusion may be performed at each time point individually, and may include a mismatch detector which restricts or excludes areas containing local motion and other registration errors.

Figure 2A:
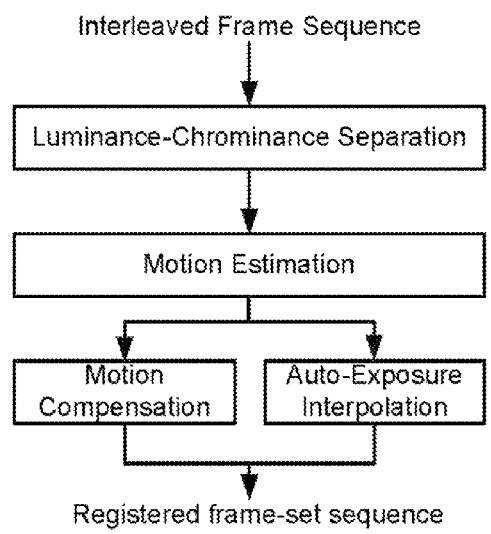
FIG. 2A is a diagram showing an exemplary registration phase.
Figure 2B:
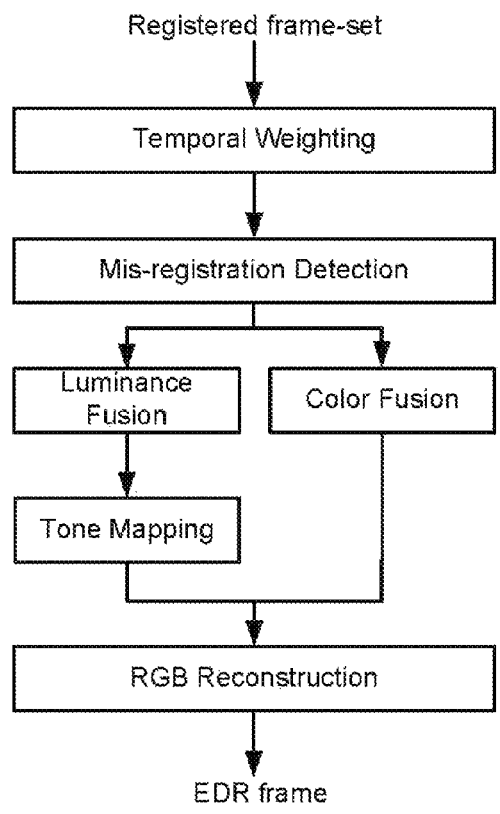
FIG. 2B is a diagram showing an exemplary fusion phase.

FIG. 2A illustrates the registration phase, and FIG. 2B illustrates the fusion phase. The system may be designed such that each of these phases are independent of each other so that each phase may be modified individually. For example, the motion estimation technique may be selected from among any suitable technique. Such a selection would only affect the system to the degree that a more accurate estimation process would produce less mis-registration and consequently increase the image detail.

The registration phase (FIG. 2A) may receive a related sequence of A- and E-frames as illustrated in FIG. 1. The frames may be converted to a luminance-chrominance color space to facilitate separate handling of intensity and color, such as the L*a*b* color space. The motion estimation may then be performed on the luminance channels, aligning each A-frame with its two surrounding E-frames. The motion estimations may be used to warp the two E-frames to the coordinate system of the A-frame, which produces a frame-set of three frames. Also, the motion estimations are used to fill-in the missing auto-exposures which were dropped in favor of E-frames. This fill-in process may be achieved by temporally interpolating each missing frame from its two surrounding A-frames and the captured E-frame.

Figure 3:
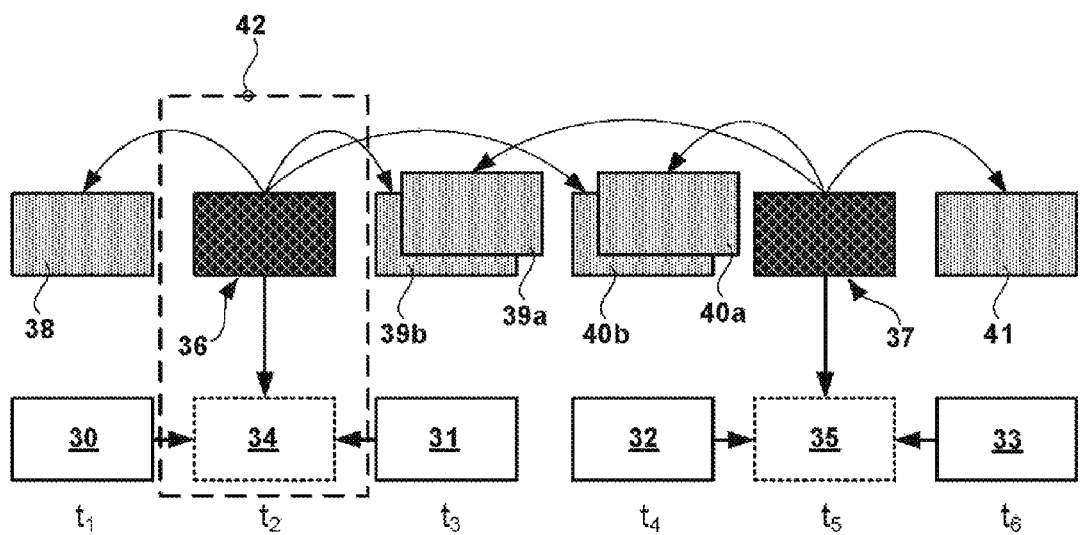
FIG. 3 is a diagram showing the relationships between captured reference frames, interpolated reference frames, enhancement frames and warped enhancement frames.

The first phase results in a series of frame-sets, one for each point in time (see FIG. 3). Each frame-set may comprise either a captured or an interpolated auto-exposure frame, and one or more aligned enhancement frames. The auto-exposure frames in these frame sets—both captured and interpolated—may be referred to as the reference frames for identification, since these are the frames which become default frames for display when no fusion is applied. The term enhancement frames is used to generally refer to both the captured E-frames and their warped versions. In FIG. 3, blank frames 30-33 with a solid outline represent captured reference frames while blank frames with a dotted outline 34-35 represent reference frames created by interpolation. Shaded frames 36 & 37 represent captured enhancement frames and lighter shaded frames 38-41 represent warped enhancement frames. Each vertical column of frames (e.g., 42) represents a frame set for a single point in time.

An exemplary fusion phase illustrated in FIG. 2B aims to fuse each frame-set to a single EDR frame in a temporally consistent manner. It may start with a single reference frame and one or more aligned enhancement frames, and due to global motion, each enhancement frame may only cover part of the reference frame. The fusion process may begin by assigning a weight value, between 0 and 1, to each of the enhancement frames. These weight values reflect the temporal distance between the corresponding enhancement frame and the reference frame. These weights may also be used to facilitate temporal consistency. The frames are then provided to a mis-registration detector, which compares them and identifies the locations where they do not sufficiently match. Such regions are marked as mis-matches and may be excluded from the fusion process or otherwise processed differently.

The luminance channel may be fused using a band-pass Laplacian pyramid decomposition which accumulates information in all scales. The color channels, which may have less accuracy, may be fused using a computationally simpler single-scale confidence-based technique. The fused luminance values commonly extend beyond the valid range of intensities, which may be resolved using an intensity compression technique. The final luminance and color channels may be recombined, and converted to RGB for display purposes.

Registration Phase

Motion Estimation

A 2-D projective global motion model may be used between the frames. The frame alignment is preferably sufficiently accurate to avoid introduction of double edges and other artifacts, and should be relatively stable under exposure change, by using a two-stage technique. The first stage may use a feature-based alignment, which provides robustness to exposure change and moderate noise. The second stage may use an iterative refinement technique which uses the output of the first stage as an initialization for the fusion process. To reduce the computational complexity, large frames may be resized prior to motion estimation.

The global motion estimations may be performed between consecutive frames in the related sequence. This increases the stability of the process since a 2-D projective motion model tends to be more accurate for smaller camera movements. Once these estimations are available for all pairs, the system may generally align any two frames in the sequence by accumulating the sequential motions between them.

Feature-Based Motion Estimation

Given two (possibly differently exposed) frames, the feature-based motion detector may use a SIFT feature matching to produce a dense point correspondence between the two frames. Since the correspondence may have a large number of outliers when the frames are of low quality (as is the case for low-cost sensors), RANSAC outlier rejection may be used to identify a set of inlier matches. A 2-D projective motion may be estimated from the inlier set using a Maximum-Likelihood estimation process.

Iterative Motion Refinement

The motion estimation provided by the feature-based process may be refined using an iterative multi-scale Lucas-Kanade-type technique. The technique reduces the point-wise error between the two images, $\|I_1 - I_2\|_F^2$, using a first-order approximation which linearizes the penalty function and leads to an iterative solver. Coarse-to-fine refinement may be employed to accelerate the process and accommodate larger motions.

When using a point-wise error, exposure compensation may be applied when using it to align differently-exposed images. A histogram may be used, matching the histogram of the enhancement frame to that of the reference. A general motion model may be used, such as a hierarchical 2-D homography model.

Motion Compensation

After the motion estimates are determined, warping may be used to align the enhancement and auto-exposure frames and create the frame-sets to be fused. For example, bi-cubic interpolation, which balances complexity and quality, may be used. A bi-linear interpolation may produce inferior results. Pixels in the warped result which are undefined may be marked by undefined numbers.

Auto-Exposure Interpolation

Whenever an E-frame is captured, the system typically loses the auto-exposure frame at that time point. To compensate for this, the system may interpolate this frame using its two neighboring A-frames as well as the captured E-frame.

Method

An exemplary interpolation technique may warp the two neighboring A-frames to the current coordinate system using motion estimates. The warped frames may then be averaged. Pixels which are only covered by one of the A-frames are copied as-is. Also, if any pixels remain undefined (those not covered by any of the A-frames), the system may fill-in these pixels using the enhancement frame, after applying exposure-compensation to the frame.

Exposure Compensation for Color Images

The system may include exposure compensation. Given two differently-exposed images, exposure compensation (also known as radiometric alignment when intensity images are involved) modifies the values of one of the images so that it mimics the exposure conditions of the other. The intensity images, exposure compensation, may be selected via histogram specification, i.e. applying a monotonic function to the intensities of one of the images so that its histogram resembles that of the other.

When processing color images the described process may be used to calibrate the luminance channels of the two images. The color channels in both images are not the same because of a combination of limited sensor sensitivity, quantization effects, and the limits of the RGB cube. A color correction may be employed, such as described below.

The color transform model relating the two images may use an affine model, $$(u_1, v_1)^T \approx A \cdot (u_0, v_0)^T + b, \quad (1)$$

where $(u_0, v_0)$ and $(u_1, v_1)$ are color values in the source and target images, respectively, $A \in \mathbb{R}^{2 \times 2}$, and $b \in \mathbb{R}^2$. The parameters of the affine model can be estimated via linear regression. Assuming the two frames are roughly aligned, the system may consider each pair of corresponding pixels as a sample for the regression process, and perform an estimation with outlier rejection for the model parameters. In some embodiments, complexity may be reduced by limiting the number of samples used for estimation.

Fusion Phase

The fusion process of the system accepts as input a single frame-set, comprising a reference frame and one or more enhancement frames, and outputs a fused EDR frame. The fusion technique also takes as input the indices of the frames in the set, to facilitate establishing the temporal distances between them. Steps of the fusion process are described below.

Temporal Weighting

The fusion process may start by assigning a temporal weight value, in the range [0,1], to each of the enhancement frames in the frame-set. The weight of an enhancement frame is determined by its temporal distance from the reference, and is used to facilitate temporal consistency.

The weights may be assigned according to the following rules. When the frame-set includes only one enhancement frame, this frame is always assigned a weight of 1. When the frame-set includes two enhancement frames, the nearer one is assigned a weight of 1, while the farther one is assigned a lower weight, which is linear in its temporal distance from the reference. To formalize this, one may denote the indices of the three frames in the set by $i_1, k_1, k_2$ where $i_1$ is the index of the A-frame, $k_1, k_2$ are the indices of the E-frames (respectively), and $k_1 < i_1 < k_2$. The weight of the farther frame is now given by $$w = w_{max} \cdot \frac{2|k_{far} - i_1|}{k_2 - k_1}, \quad (2)$$

where $k_{far} \in \{k_1, k_2\}$ is the index of the farther frame, and $0 \leq w_{max} \leq 1$ is an optional constant representing the maximal weight assigned the farther frame.

$w_{max} = 0.6$ may be selected and the Gaussian kernel $\sigma$ may be chosen relative to the size of the image; for an N×M image we use $\sigma = \min(N, M)/50$.

Mis-Registration Detection

Mis-registration detection maps regions in the enhancement frames which are not accurately enough aligned with the reference, and selectively excludes them from the fusion process.

Alternative Embodiments

The mis-registration detection processes may be performed by comparing pairs of images by applying exposure compensation to one of the two and computing the error at each pixel. Pixels having an error above some predefined threshold are identified as suffering from local motion (except when either of these is saturated). A pixel suspected of object motion is filled-in using the least-saturated image at that location, such as averaging it with other images whose intensity at that pixel does not significantly differ.

Local entropy may be used as an indicator of object motion. The entropy of an image block tends to be less affected by exposure changes, and is more related to the structure in that block. The motion detector computes the entropy in a window around each pixel, and designates it as containing motion if this entropy differs too much between exposures. Once motion is detected, the pixel is filled-in using the least-saturated image, employing a smoothing procedure to avoid visible discontinuities.

An exemplary estimation process begins by downscaling (as necessary) the two images to be aligned in order to reduce computational cost. The estimation process produces a 3×3 homography matrix $H_0$ which relates the two downscaled images, such that for each pixel location $x_1 = (x_1, y_1, 1)$ in the first, the corresponding location in the second is $x_2 \sim H x_1$, with ~ denoting equality up to a factor. Translating this to a relation H between the two original images—assuming that pixel coordinates begin at (1,1)—is achieved by computing $$H = \begin{pmatrix} c & 0 & 1-c \\ 0 & c & 1-c \\ 0 & 0 & 1 \end{pmatrix}^{-1} H_0 \begin{pmatrix} c & 0 & 1-c \\ 0 & c & 1-c \\ 0 & 0 & 1 \end{pmatrix}, \quad (3)$$

where $c < 1$ represents the downscaling factor.

Detecting Mis-Registration Between Different Exposures

The system may assume two differently-exposed images of the same scene generally, globally aligned. Sources of mis-registration may be, for example (a) constraints imposed by the assumed global motion model, (b) failure to estimate the optimal motion parameters within the assumed model, (c) aliasing artifacts in high-frequency regions which translate to incompatible patterns in the two frames, and (d) moving objects. These embodiments handle all these cases in the same way, detecting the incompatibility and excluding the affected region from the fusion process.

Figure 4:
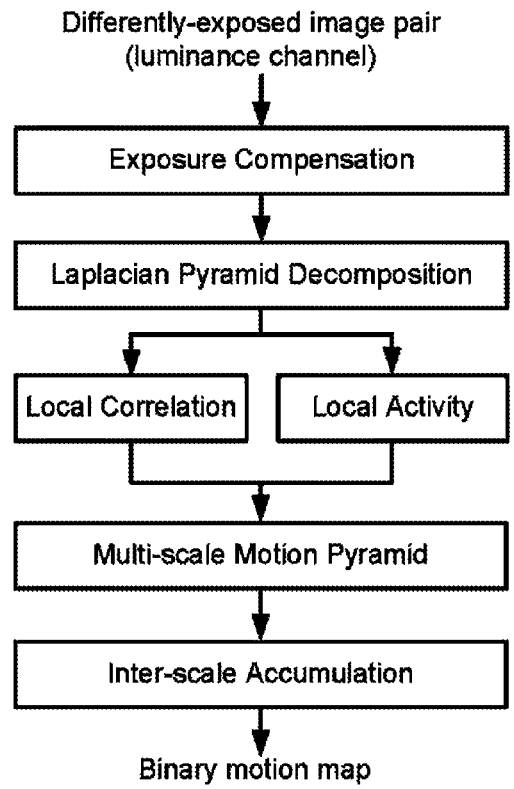
FIG. 4 is a diagram showing an exemplary mis-registration detection algorithm.

One technique for detecting mis-registration between differently exposed images is illustrated in FIG. 4. The luminance channels of the two images may be used for processing. These processes may start by applying exposure compensation to bring the enhancement frame closer to the reference frame. The system may next compute the Laplacian pyramid of the two images. The Laplacian pyramid reveals details in the image over many scales, spanning fine textures to large objects. A moving object will cause the two pyramids to differ in the corresponding scale, and in finer scales.

For each band-pass level of the pyramid, the system may compute a mis-match map as follows. Let $p_{i,j,k}^1$ and $p_{i,j,k}^2$ be two corresponding pixels at location (i,j) and scale k of the two pyramids. One value that may be used to quantify the correspondence between the two pixels is the normalized correlation between the two N×N windows surrounding them at the k-th scale. Formally, if the system arranges the pixels in the N×N window surrounding $p_{i,j,k}^1$ as the vector $w_{i,j,k}^1$ and the pixels surrounding $p_{i,j,k}^2$ as the vector $w_{i,j,k}^2$, our correspondence measure as:

$$\rho_{i,j,k} = \frac{E\{(w_{i,j,k}^1 - \langle w_{i,j,k}^1 \rangle)(w_{i,j,k}^2 - \langle w_{i,j,k}^2 \rangle)\}}{\sqrt{E\{(w_{i,j,k}^1 - \langle w_{i,j,k}^1 \rangle)^2\}} \cdot \sqrt{E\{(w_{i,j,k}^2 - \langle w_{i,j,k}^2 \rangle)^2\}}} \quad (4)$$

$$= \frac{(w_{i,j,k}^1 - \langle w_{i,j,k}^1 \rangle)^T (w_{i,j,k}^2 - \langle w_{i,j,k}^2 \rangle)}{\|w_{i,j,k}^1 - \langle w_{i,j,k}^1 \rangle\|_2 \|w_{i,j,k}^2 - \langle w_{i,j,k}^2 \rangle\|_2}.$$

The correspondence measure takes values within $[-1,1]$, and will be high (close to 1) when the two pixels have similar edge patterns around them. As opposed to an entropy-based detector, for instance, this measure is sensitive to fine texture incompatibilities, which may ultimately result in fuzziness in the fused result. It similarly detects incompatible aliasing patterns, other non-coinciding edges, and tends to be robust to exposure changes as it is not substantially influenced by affine scaling.

Using $\rho_{i,j,k}$ as-is would effectively result in completely excluding all the areas where one of the frames actually lacks detail. Therefore, if either of the frames has very little detail in some neighborhood, the system may ignore the value of $\rho_{i,j,k}$ there and proceed with the fusion. To quantify the amount of activity around a pixel $p_{i,j,k}$, the system may use the total energy of its surrounding window in the Laplacian pyramid, given by $$\epsilon_{i,j,k} = \|w_{i,j,k}\|_2^2. \quad (5)$$

Since non-zero entries in the Laplacian pyramid correspond to features in the image, this measure directly quantifies the amount of detail surrounding $p_{i,j,k}$, in the respective scale.

Using (4) and (5), the system defines a mis-match detector, that begins with a multi-scale binary mis-match pyramid $m_{i,j,k}$ defined as $$m_{i,j,k} = \{\rho_{i,j,k} < \hat{\rho}\} \text{ and } \{\epsilon_{i,j,k}^1 > \hat{\epsilon}_k\} \text{ and } \{\epsilon_{i,j,k}^2 > \hat{\epsilon}_k\}. \quad (6)$$

$\hat{\rho}$ and $\{\hat{\epsilon}_k\}$ are predefined thresholds. This map contains 1's wherever the correlation coefficient between the two frames is small, and both have significant enough activity. The system may also different activity thresholds $\hat{\epsilon}_k$ for the different pyramid levels since these values are not normalized, and image derivatives tend to decrease substantially in coarser scales.

Given this pyramid, the final step of the technique may be to combine its different levels and generate the final motion map. This may be by merging the levels of the pyramid in a manner resembling a Laplacian pyramid reconstruction process. Namely, the system expands the coarsest level, add it to the level above it, and repeat until the entire pyramid has been processed. The value of each pixel in the accumulated result is roughly the number of scales in which that pixel has been found to contain motion. The system may consider a single scale as sufficient to indicate motion, and output a binary map with 1's wherever the pixel value accumulated to above a threshold value.

Generating the Mis-Match Maps

The aforementioned techniques may be utilized to form the complete mis-match detection system for the fusion process. The system may assume that at every point in time has a reference frame and either one or two enhancement frames. As can be seen in FIG. 3, at most time points the system has two enhancement frames for each reference frame, which originate from the two surrounding E-frames in the sequence. In some points in time, however, the system has only one enhancement frame. This occurs when an E-frame is captured, as well as at the first and last few frames of the sequence where only one temporally neighboring E-frame exists.

When only one enhancement frame is available, some embodiments may construct a mis-match map for that enhancement frame. When two enhancement frames are available, however, the system may add another step which compares these two enhancement frames among themselves, as the information they contribute may be conflicting when object motion or registration errors exist.

The system compares the two enhancement frames by computing a pixel-wise error map between them and thresholding this map. As the two are similarly exposed, they should be generally the same except where object motion or registration errors exist (which may be identified as large entries in the error map). To allow detection of larger moving objects rather than only their boundaries, the system may repeat the computation over many scales in a Gaussian pyramid. Thus, the system computes a binary motion pyramid by thresholding the difference between each pair of corresponding levels, and merges the resulting binary motion pyramid into a single motion map as in the case of differently-exposed images.

Finally, given the mis-match maps $m_{0,1}$ and $m_{0,2}$ between each of the enhancement frames and the reference frame, as well as the mis-match map $m_{1,2}$ between the two enhancement frames, a binary OR may be applied between them to obtain the final mis-match maps for the enhancement frames:

$$m_1 = m_{0,1} \text{ or } m_{1,2}$$

$$m_2 = m_{0,2} \text{ or } m_{1,2} \quad (7)$$

Temporal Consistency

The exemplary motion detector described above is not temporally stable. Consider the sequence of frames $(E_1, \ldots I_1, E_2, I_2, \ldots, E_3)$ where $E_1, E_2, E_3$ are three consecutive E-frames and $I_1, I_2$ are two A-frames. The frame-set at $I_1$ consists of $\{I_1, E_1, E_2\}$, the frame-set at $E_2$ consists of $\{\text{Interp}(I_1, I_2), E_2\}$, and the frame-set at $I_2$ consists of $\{I_2, E_2, E_3\}$. Applying the described mis-match detection scheme, the frame $E_2$ will be masked by its mis-matches with $E_1$ when fused with $I_1$, by its mis-matches with $E_3$ when fused with $I_2$, and not masked at all when fused with the interpolated frame. This may cause a significant amount of visual disturbance around the E-frames.

To reduce this limitation, a temporal adaptation may be used to ensure that as one gets closer to an E-frame, the influence of the farther E-frames gradually decreases. Recall that the mis-match map between two enhancement frames may be computed by taking the pixel-wise difference between them and thresholding the result (this may actually be repeated for many scales). Also, as the mis-match threshold increases, the detector becomes less sensitive to discrepancies between the two frames. Specifically, with image intensities within [0,1], then a threshold near 1 practically cancels mis-match detection. Utilizing this observation the system may temporally stabilize the process by gradually varying the threshold in time for each of the enhancement frames individually. Hence, given the difference map between two enhancement frames, the system produces two different mis-match maps from it—using two different thresholds—one for each of the frames. By granting a larger threshold to the temporally closer frame, the system reduces the influence of the farther frame on it. These thresholds can be smoothly varied in time to achieve a temporally consistent result. The two resulting mis-match maps are used to replace the map $m_{1,2}$ in (7), which was originally common to both frames.

Alternative Mis-Match Detection Embodiments

There may be situations where the detection methods may fail to detect mis-registration. For example, the techniques may not tend to detect a mis-match in regions where one of the images lacks detail, and assumes the added information is missing from the other exposure. As an alternative, the system may replace local activity as an indicator of missing detail with saturation. Thus a mis-match may be declared when the two images have low correlation and both are not saturated.

Fusing the Luminance Channels

In general, the fusion process of a set of luminance channels fuses to a single intensity image the accumulation of details from all the images. The process takes as input a set $\{I_1, E_1, M_1\}$ when only one enhancement frame is available, or a set $\{I_1, E_1, E_2, M_1, M_2\}$ when two enhancement frames are available, with $M_1$ and $M_2$ the two mis-match maps associated with the enhancement frames. The technique is basically a three-step process:
  1. Compute an adaptive Laplacian pyramid for each of the input frames;
  2. Merge the pyramids using pixel-wise maximization in each level; and
  3. Retrieve the output image via reconstruction of the merged Laplacian pyramid.

In these embodiments, the Laplacian pyramid is suitable. First, it has been shown to be significantly more temporally stable than a critically-sampled Wavelet transform. At the same time, it was only found to be slightly less temporally stable than the shift-invariant Wavelet transform or the gradient pyramid, and this seems to be more relevant when fusing images from very different sources. The Laplacian pyramid is suitable for images with undefined regions.

Adaptive Image Pyramids

A. Gaussian and Laplacian Pyramids

The Gaussian and Laplacian pyramids of an image may be used for multi-scale and band-pass image analysis. The pyramids are constructed using the two primary operations, shrink and expand. The shrink operation downscales an image by a factor of 2, and employs smoothing to reduce aliasing. The expand operation upscales an image by a factor of 2, employing smoothing as well to reduce the introduction of high frequencies.

Given an intensity image I, its Gaussian pyramid $G=\{G_1, G_2, \ldots, G_n\}$ is a series of downscaled versions of this image, with $G_1=I$ and $G_{i+1}=\text{shrink}(G_i)$. The Gaussian pyramid is commonly used for multi-scale image processing tasks. The Laplacian pyramid $L=\{L_1, L_2, \ldots, L_n\}$ of an image is essentially a band-pass decomposition of the image. It is computed from its Gaussian pyramid via $L_n=G_n$ and $L_{i-1}=G_{i-1}-\text{expand}(G_i)$. Each level of the Laplacian pyramid represents a different band of the image frequency range, with relatively low redundancy due to the downsampling of these levels.

B. Adaptive Gaussian Pyramids

The Gaussian and Laplacian pyramids are well-defined as long as the image is defined over its entire grid. While this is true for the reference frames, this will generally not be the case for the enhancement frames. The enhancement frames, which are warped versions of past or future E-frames, will typically have areas where they are undefined due to global motion.

The shrink operation used to construct the Gaussian pyramid involves smoothing the image and downsampling it. Smoothing is commonly implemented via a convolution with a small separable Gaussian kernel, with its weights normalized so they sum to 1. The downsampling involves discarding image samples and leaving only the odd (or even) indexed ones.

When some of the image samples are undefined, a difficulty arises in the smoothing process whenever the output pixel depends on values which are undefined. Recall that for an image $I=\{I_{i,j}\}$ and smoothing kernel $g=\{g_{i,j}\}$, the output $J=\{J_{k,l}\}$ is defined by $$J_{k,l} = \sum_{p,q \in \{-1 \ldots 1\}} g_{p,q} \cdot I_{k-p,l-q}. \tag{8}$$

When undefined values of I exist in this summation, one approach is to set the resulting $J_{k,l}$ to be undefined as well. However, as the coarser Gaussian pyramid levels are constructed, this will gradually eliminate an increasing number of pixels, causing the coarsest pyramid levels to cover only a fraction of the original image area. The Laplacian pyramid constructed from this will suffer from even further detail loss as each of its levels depends on two Gaussian pyramid levels, hence accumulating both their undefined regions. Ultimately, this results in missing details in the fused result, leading to sub-optimal performance.

To overcome this limitation the computation (8) may be modified so that only defined values are taken into account:

$$J_{k,l} = \frac{\sum_{(p,q) \in \Omega} \{g_{p,q} \cdot I_{k-p,l-q}\}}{\sum_{p,q \in \Omega} \{g_{p,q}\}}. \tag{9}$$

In this expression, $\Omega$ is a subset of $\{-1 \ldots 1\} \times \{-1 \ldots 1\}$ which corresponds to defined pixels in I. The normalization comes to ensure that the weights in this summation still add up to 1. Note that for output pixels which depend entirely on defined values, this computation is equivalent to the previous one. In this modified formulation, only pixels which depend entirely on undefined values (thus denominator=0) are tagged as undefined.

These embodiments essentially perform extrapolation of the image around its boundaries, assuming some form of continuous behavior of the image. Unfortunately, this extrapolation will not always be valid, and when it fails, it may introduce details which did not originally exist in the image, causing visible artifacts in the fused result. Accordingly, the system may limit the use of (9) to output pixels which depend on some minimal number of defined input pixels, setting the rest to undefined numbers. Formally, the system may define a weight threshold $0 \leq \mu \leq 1$ such that:

$$J_{k,l} = \begin{cases} \dfrac{\sum_{(p,q) \in \Omega} \{g_{p,q} \cdot I_{k-p,l-q}\}}{\sum_{p,q \in \Omega} \{g_{p,q}\}} & \text{if } \sum_{p,q \in \Omega} \{g_{p,q}\} \geq \mu \\ \text{NaN} & \text{otherwise.} \end{cases} \quad (10)$$

This formulation is a generalization of both (8) and (9): setting $\mu=1$ reproduces computation (8) (only outputs with all inputs defined are defined), while setting $\mu=0$ reproduces (9) (any output with a defined input is defined).

Unfortunately, every fixed choice of $\mu$ imposes significant drawbacks: lower values cause artifacts, while high values cause missing detail. To overcome this, a new adaptive construction process may be used, which selects the value of $\mu$ for each pixel individually based on the contents of the image at that location. Therefore, a unique threshold $\mu_{k,l}$ to each output pixel, leading to the process:

$$J_{k,l} = \begin{cases} \dfrac{\sum_{(p,q) \in \Omega} \{g_{p,q} \cdot I_{k-p,l-q}\}}{\sum_{p,q \in \Omega} \{g_{p,q}\}} & \text{if } \sum_{p,q \in \Omega} \{g_{p,q}\} \geq \mu_{k,l} \\ \text{NaN} & \text{otherwise.} \end{cases} \quad (11)$$

The selection of $\mu_{k,l}$ may be based upon the amount of activity in the image around that pixel. This type of pyramid construction may be referred to as an adaptive Gaussian pyramid. According to this approach, a $\mu$-map for the image may be compressed, which assigns a value of $\mu$ between 0 and 1 to each pixel, and once this map is determined, the system applies computation (11) and proceeds with the downsampling. It should be emphasized that using the modified computation (11) does not affect output pixels which depend entirely on defined inputs—disregarding their assigned value of $\mu_{k,l}$—since the total weight of their input pixels will sum to 1. Specifically, this means that the Gaussian pyramid of an entirely defined image will remain unaltered.

In constructing the $\mu$-map the extrapolation operation is more accurate where the true image values on both sides of the border are similar. Therefore, the value of $\mu_{k,l}$ may be derived from the local image gradient, considering only the component normal to the boundary; the stronger the normal component, the more likely it is that the extrapolation will fail, and therefore a higher value of $\mu$ should be imposed. However, the gradient along the border cannot be readily concluded from the enhancement frame itself. Therefore, the system may estimate these gradients from the reference frame. The guiding assumption behind this is that if a strong enough gradient exists near the border, it will have some evidence in the reference frame.

The computation of the $\mu$-map may be as follows. Assume one is computing the $i+1$-th level of the adaptive Gaussian pyramid given its $i$-th level. To determine the correct $\mu$-map, then refer to the $i$-th level of the reference frame's Gaussian pyramid. Its gradients are computed by convolving it with the Sobel x and y derivatives kernels $k_x = (0.25, 0.5, 0.25)^T(-0.5, 0, 0.5)$ and $k_y = k_x^T$:

$$d_x^{ref} = I_{ref} * k_x$$

$$d_y^{ref} = I_{ref} * k_y \quad (12)$$

The process continues by computing the normals to the boundary of the undefined region in the enhancement frame. For this, one may define a binary map $I_{bound}$ containing 1's where the frame is defined and 0's elsewhere. One may compute the gradients of this map using the same Sobel kernels, $$d_x^{bound} = I_{bound} * k_x$$

$$d_y^{bound} = I_{bound} * k_y \quad (13)$$

One may normalize these gradients to obtain unit vectors:

$$(n_x^{bound}, n_y^{bound}) = \begin{cases} \dfrac{(d_x^{bound}, d_y^{bound})}{\|(d_x^{bound}, d_y^{bound})\|} & \text{if } \|(d_x^{bound}, d_y^{bound})\| > 0 \\ (0, 0) & \text{otherwise} \end{cases} \quad (14)$$

Finally, from (12) and (14) one may compute the normal component of the gradient via:

$$d_n = (d_x^{ref}, d_y^{ref})(n_x^{bound}, n_y^{bound})^T. \quad (15)$$

Given the values $d_n$, one may now assign a $\mu$ value to each pixel according to the following rule:

$$\mu = \begin{cases} \mu_1 & |d_n| < t_l \\ \mu_2 & t_l \leq |d_n| \leq t_h \\ 1 & |d_n| > t_h. \end{cases} \quad (16)$$

Here, $t_l$ and $t_h$ are two thresholds which distinguish between low and high derivatives, and $\mu_1 < \mu_2$ are two fixed values of $\mu$. According to this rule, when the derivative is large one may cancel extrapolation completely ($\mu=1$), when the derivative is very low one may allow strong extrapolation ($\mu=\mu_1$, with $\mu_1$ close to 0), and when the derivative is in between, moderate extrapolation may be performed ($\mu=\mu_2$, where $\mu_2 \sim 0.5$).

C. Adaptive Laplacian Pyramids

Constructing a Laplacian pyramid for an image with undefined regions imposes similar difficulties as constructing a Gaussian pyramid. One may begin by constructing the adaptive Gaussian pyramid of the image, as previously described. Once this pyramid is computed, computing the Laplacian pyramid from it involves a series of expand operations and image subtractions.

One may define the subtraction operation to result in undefined numbers if any of the arguments is undefined. This ensures that if the expanded coarser Gaussian level covers more than the current Gaussian level due to extrapolation, this area will be eliminated in the subtraction process.

The expand operation implementation is similar to the reduce operation in the adaptive Gaussian pyramid. The expand procedure begins by up-sampling the image, where one uses undefined-number-filling rather than zero-filling to distinguish between defined and undefined pixels. Next, one multiplies the values of the defined pixels by 4 to maintain brightness. Finally, one smoothes the image using a small separable Gaussian kernel, taking only the defined pixels into account. One then may use the smoothing operation given in (10), which imposes a minimum weight on the defined pixels to avoid over-extrapolation.

As can be seen, for the expand operation the system may chose a fixed value of $\mu$ for the entire image, rather than an adaptive value. Indeed, it has been determined that as long as the adaptive Laplacian pyramid is based on an adaptive Gaussian pyramid, more delicate fine-tuning of $\mu$ is unnecessary.

The preferred choice of μ in the expand operation is [0,0.25] rather than [0,1], since the undefined-numbers-filling causes the maximal weight of the defined pixels in any window to be 0.25.

The smoothing kernel is preferably a 5×5 normalized approximation of a 2-D Gaussian with σ=1. The downsampling process leaves the upper-left pixel of the image and all pixels on the ×2 sub-sampled dyadic grid originating from that pixel; for an N×M image, this leads to a result of size $\lceil N/2 \rceil \times \lceil M/2 \rceil$. The system may use $t_l$=0.01, $t_h$=0.1, $\mu_1$=0.1, $\mu_2$=0.5.

Merging the Pyramids

A. Basic Process

Given the Laplacian pyramids of the reference and enhancement frames—$L^{ref}$, $L^1$, and $L^2$, respectively, a pixel-wise maximization between them may be used, ---
Algorithm 1: Basic luminance fusion process.

Input: $L^{ref}$ - reference Laplacian pyramid, $L^1$, $L^2$ - enhancement Laplacian pyramids
1. $L_n = L_n^{ref}$
2. $L_i(x,y)$ = maxabs $\{L_i^{ref}(x,y), L_i^1(x,y), L_i^2(x,y)\}$
--- at all levels except the coarsest one, such that the system accumulates the details from all frames in a single pyramid.

In the e case where no mis-matches exist and the temporal weights are ignored, the fusion process is summarized by the process described in Algorithm 1. In the algorithm description, the function maxabs performs maximization of its arguments disregarding sign, i.e., returns the maximal argument in absolute value times its sign.

B. Fusion with Multi-Scale Blend Pyramids

To accommodate mis-matches, temporal weighting, and other phenomena, one may generalize the basic process to allow a multi-scale blend pyramid to be assigned to each enhancement frame pyramid. This pyramid is of the same size as the enhancement frame's Laplacian pyramids, and assigns to each pixel in it a blend value within [0,1]. A blend value of 0 means that this pixel should not be considered in the maximization process (due to mis-match, for instance), while a blend value of 1 means that the pixel should be fully processed, as in the original formulation. Described below is an exemplary procedure for computing the blend pyramid.

Assuming the blend pyramids are given, Algorithm 2 describes an exemplary modified fusion process which takes into account these pyramids. Note that for each pyramid level i, the output is initialized with the reference level. The enhancement frames are then processed sequentially; each enhancement value $L_i^k(x, y)$ is compared to the current contents of the output pyramid, and if it is larger, it is blended-in according to its associated weight One property of this process is that it forms a direct generalization of Algorithm 1, since for any pyramid location where all assigned blend values are 1, the output of both algorithms will be the same. The idea is that—as in the original formulation—the system only considers new information when it is larger than the current output value, which is our indication that the frame contains information not currently represented in the output pyramid. Yet, when the associated blend value is less than one, one may limit the effect of this new information, based on the blend value. This effectively results in a gradual fading of these details as the blend value decreases, which produces smoother fusion results.

C. Generating the Blend Pyramids

The process which is used to generate the enhancement frame blend pyramids as described below. The process takes as input the adaptive Laplacian pyramids $L^1$, $L^2$ of the enhancement frames, their associated binary mis-match maps $M_1$, $M_2$, and the temporal weights $w_1$, $w_2$. The output of this process is a pair of blend pyramids $P^1$, $P^2$, the same size as $L^1$ and $L^2$, containing blend values between 0 and 1.

The system initializes the blend pyramids by disregarding the mis-match maps altogether, and only taking into account the temporal weights. For every pixel location (i, j, k) in the pyramids, where (i,j) is the spatial location and k is the pyramid level, one first determines whether this location is covered by 0, 1, or 2 enhancement pixels (this depends on the regions where the two enhancement pyramids are defined). The blend values of the n-th enhancement frame are then determined according to the formula:

$$p_{i,j,k}^n = \begin{cases} w_n & \text{if } def(L_{i,j,k}^n) \text{ and } def(L_{i,j,k}^{2-n}) \\ 1 & \text{if } def(L_{i,j,k}^n) \text{ and not } def(L_{i,j,k}^{2-n}) \\ 0 & \text{otherwise,} \end{cases} \qquad (17)$$

where def (x) is true when x is defined. Thus, in the typical case where both enhancement frames are defined at (i, j, k), the blend values are simply the associated temporal weights (note that the weights are chosen such that at least one of them will be 1). Frames which do not cover a location are always assigned a blend value of 0, and if a single enhancement frame covers some location then it is assigned a blend value of 1. This process ensures that for any pyramid location covered by at least one enhancement frame, one of the frames is assigned a blend value of 1.

---
Algorithm 2: Luminance fusion with blend pyramids.

Input: $L^{ref}$ - reference Laplacian pyramid, $L^1$, $L^2$ - enhancement Laplacian pyramids,
$P^1$, $P^2$ - enhancement blend pyramids
1. $L_n = L_n^{ref}$
2. $L_i = L_i^{ref}$
3. for k = 1..2 do
    A. $J = \{(x,y) : |L_i^k(x,y)| > |L_i^{ref}(x,y)|\}$
    B. $\forall (x,y) \in J, L_i(x,y) = (1 - P_i^k(x,y)) \cdot L_i(x,y) + P_i^k(x,y) \cdot L_i^k(x,y)$
---

Once each enhancement frame has an initial blend pyramid, its associated mis-match map is incorporated into the blend pyramid as follows. First, one computes a multi-scale representation M of the binary mis-match map m. The process is similar to a standard Gaussian pyramid construction, except that each reduce operation (which outputs a floating-point result) is followed by a binary thresholding operation, with a threshold of 0.5, which converts the output back to binary. The process is given by $$M_1 = m, M_{k+1} = \{\text{reduce}(M_k) > 0.5\}.$$

Next, each level of this binary pyramid is smoothed using a Gaussian kernel, with decreasing standard deviation values $\sigma_k = \sigma_0 \cdot 2^{-k}$ matching the size of each pyramid level:

$$M_k = M_k * \sigma_k$$

To complete the computation, one may pixel-wise multiply the initial blend pyramid computed in (17), with the smoothed mis-match pyramid, thus concluding the process.

A mis-match detector for differently-exposed images may operate on 7×7 blocks. After applying exposure compensation to the enhancement frame, one computes an adaptive Laplacian pyramid for each of the frames, as described. For each pair of corresponding pixels in these pyramids, one computes the normalized correlation between their 7×7 neighborhoods, as defined in (4), using symmetric padding for border pixels. One may compute the local activity of each of the two 7×7 neighborhoods, as defined in (5). In this exemplary embodiment, the pixel is defined as having motion if the normalized correlation is below $\hat{\rho}=0.7$, and the local activity of both blocks is above $\hat{\epsilon}=0.8/2^k$, where k=1, 2, . . . , K is the level number, from fine to coarse. The choice of $\hat{\epsilon}_k$ assumes intensity values within [0,1]. Once the binary mis-match pyramid has been constructed, one converts it to double representation and apply a Laplacian rebuild procedure to accumulate the contributions of all levels. The final mis-match map is obtained by setting to 1 every pixel with a value >0.9 (motion detected in at least one scale).

The mis-match detector for similarly exposed frames may begin by computing an adaptive Gaussian pyramid for each of the frames. For each pair of corresponding pixels in these pyramids, one computes their difference (in absolute value) and compare it to the two pre-defined thresholds. This produces two binary mis-match pyramids, one for each of the frames, which are subsequently accumulated to two mis-match maps as described above. The thresholds may assume luminance values within [0,1], and are given by $$T_1 = T_0 + \alpha \cdot (w_1 - w_2)$$

$$T_2 = T_0 + \alpha \cdot (w_2 - w_1) \quad (18)$$

where $T_0=0.08$ and $\alpha=0.03$ are constants, and the values $w_1, w_2$ are the temporal weights, between 0 and 1, assigned to the two frames. Since the weight of the temporally closer frame will be larger, this frame will be assigned a larger threshold (above $T_0$) while the second frame will be assigned a lower threshold (below $T_0$).

Reconstructing the Output Luminance

The process results in a single merged Laplacian pyramid representing the output luminance channel. To obtain the fused result, one may apply a Laplacian reconstruction process given by $I^n = L_n$ and $I^{k-1} = \text{expand}(I^k) + L_{k-1}$; the output of the process is $I = I^1$. Note that since the Laplacian pyramid contains no undefined values, a standard expand operation may be used.

Tone Mapping and Intensity Compression

The fused luminance channel resulting from the Laplacian reconstruction process will typically contain values beyond the valid intensity range, depending on the amount of information the enhancement frames contributed to the saturated regions of the reference. In fact, when fusing two images using the basic fusion process, the theoretical output intensity range is [−1,2] for input images in the range [0,1]. In practice, one can expect the intensity range of the output to increase by about 50% over the input: when the enhancement frames are under-exposed the output range may be around [0,1.5], and when the enhancement frames are over-exposed the output range may be around [−0.5,1]. Such an intensity range may be referred to as medium dynamic range (MDR).

To produce a displayable result, one may use intensity compression to map the medium dynamic range to a low dynamic range, as used by standard imaging devices. A component of this process is a tone-mapping method, similar to HDR tone-mapping techniques, which compresses the intensity range in a spatially adaptive manner and applies stronger compression to the more saturated regions. This process reduces the dynamic range of the image, while keeping the mid-tones fixed so as to maintain the overall appearance of the reference frame. At the same time, the saturated regions are brought closer to the valid range, with minimal contrast loss. After applying the tone-mapping process, the result undergoes an additional intensity compression which ensures that the output only contains values within [0,1].

MDR Tone-Mapping

One may use a tone-mapping procedure that is spatially adaptive so that out-of-range areas are compressed more than in-range areas. A smooth compression map may be computed which is subtracted from the intensity image to produce the tone-mapped result. As long as this compression map primarily contains only low frequencies, the result will retain local contrast and will introduce negligible artifacts. In our implementation the compression map contains positive values only, and is computed such that it is larger for out-of-range areas, and smaller (or zero) for in-range areas.

The tone-mapping procedure is described in Algorithm 3. The process is described for an MDR image with a range of [0,1+δ], but a similar technique may can be described for an image with a range of [−δ,1]. The tone-mapping process includes constructing a Laplacian pyramid of the image, applying a compression map to the

---

Algorithm 3: MDR tone-mapping of an image with range [0, 1 + δ].

---

Input: I - MDR image, v ∈ [0,1] - saturation point, c - tone-mapping strength
1. S = max (I − v, 0)
2. G = Gausspyr(S)
3. L = Laplacepyr(I)
4. $L_n = L_n - c \cdot G_n$
5. I = Laplacerebuild(L)

--- coarsest level of this pyramid, and rebuilding the tone-mapped result. By computing the compression map for the coarsest level of the pyramid, we ensure that it contains low-frequency components.

The tone-mapping process may receive two parameters: a saturation point v and a strength coefficient c. v defines a saturation map S for the image, which contains zeros where the image is below v, or the saturation amount I−v where it is above v. This map may be reduced to the size of the coarsest Laplacian pyramid level via repeated reduce operations; in the algorithm description this is described as computing the Gaussian pyramid G of S, however only the coarsest level of that pyramid, $G_n$ could be used if desired.

The map $G_n$ zero in regions which are entirely below the saturation point, and it gradually increases in regions which are above the saturation point. This map has values that are proportional to both the number of saturated pixels, and to the amount by which they are saturated. In regions which contain many out-of-range values one may allow larger compression than in regions which are predominantly within range and contain only a few saturated pixels. Similarly, a stronger compression when the values are largely out-of-range than when they are almost within range may be used.

The map $G_n$ may be used as the base compression map. For the actual compression, one may multiply this by some strength factor c (typically near 1) which controls the amount of tone-mapping applied. A larger value compresses the out-of-range areas more than a smaller value.

Fixed Compression

Figure 5:
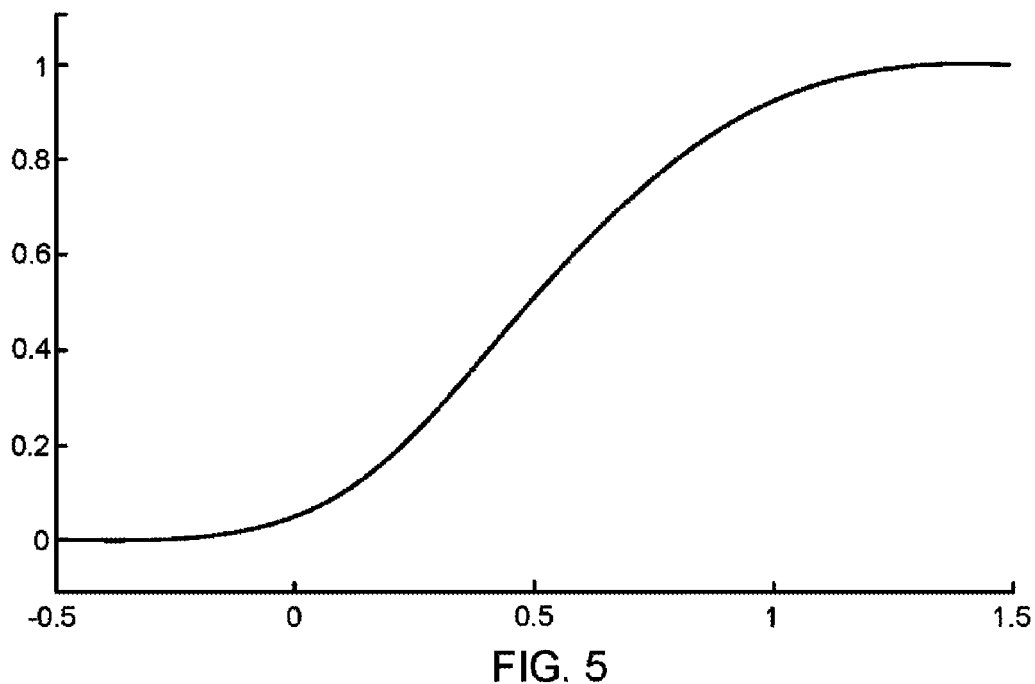
FIG. 5 is a plot of an exemplary tone mapping function.

The described tone-mapping process does not guarantee output values within [0,1], and some out-of-range values will usually remain. Therefore, one may supplement the adaptive tone-mapping process by a fixed global compression function, shown in FIG. 5. This compression function is designed to be identity (derivative=1) in the mid-tone range, and gradually increase its compression to the high- and low-tone ranges. Such a function does not maintain contrast in the extreme areas, and will eliminate significant information if applied directly to the MDR fusion result. The adaptive tone-mapping process preceding this reduces this destructive effect by bringing the out-of-range areas closer to the mid-range zone.

The compression function takes two parameters: the mid-tone range $a=(a_{min}, a_{max})$ where no compression is performed (output equals input), and the compression range $x=(x_{min}, x_{max})$ which is the range mapped one-to-one to [0,1]. Any value beyond the compression range will be saturated to 0 or to 1. The compression function is designed to be $C^1$-smooth, and is given by $$f(x) = \begin{cases} 0 & x < x_{min} \\ \alpha_1(x-a_{min})^3 + \beta_1(x-a_{min})^2 + x & x_{min} < x < a_{min} \\ x & a_{min} < x < a_{max} \\ \alpha_2(x-a_{max})^3 + \beta_2(x-a_{max})^2 + x & a_{max} < x < x_{max} \\ 1 & x > x_{max} \end{cases}$$

By construction, one has continuity of f and its derivative at $a_{min}$ and $a_{max}$. The constants $\alpha_1, \beta_1, \alpha_2, \beta_2$ are determined by imposing the continuity constraints on f and its derivative at $x_{min}$ and $x_{max}$, which lead to two linear equations for each pair of parameters.

It should be noted that the above compression function, while guaranteeing smoothness, does not guarantee monotonicity, which is a critical requirement from a compression function. Monotonicity is obtained, however, for many reasonable choices of a and x. To avoid excess complication, one may keep these parameters fixed for all input sequences.

Fusing the Color Channels

Basic Process

Fusion of the color channels is performed directly on the finest scale. The chromaticity information at each pixel from the frame which is least saturated at that location is used, since it is expected to have the most reliable measurement. Quantitatively, one defines the confidence at each pixel as the distance of its luminance from the mid-tone value:

$$\text{conf}(x,y) = 1 - |2 \cdot I(x,y) - 1|. \quad (19)$$

The confidence is highest (close to 1) for pixels with luminance near 0.5, and decreases to 0 as the luminance approaches saturation. Thus, one takes the color information at each pixel from the frame with highest confidence, which should provide the most accurate information.

Color Fusion Maps

One limitation of the aforementioned system is that when different enhancement frames cover different regions of the reference, the proposed process will not ensure a smooth color transition between them if they have different color balances. Also, the process does not accommodate mis-match maps, temporal weights, etc.

To address this, one may generalize the fusion process so it accepts a color fusion map associated with each enhancement frame. The color fusion map assigns a weight within [0,1] to each pixel in the frame, which describes its contribution to the fused result. The color fusion map can represent different properties such as the degree of mis-match with the reference, the frame's temporal weight, etc. Specifically, to ensure smooth color transitions between different enhancement frames, one may assign decreasing values to the color fusion map near the boundaries of the enhancement frame's defined region, whenever it overlaps with another enhancement frame.

The construction of the color fusion maps is described below. Given these maps, the fusion process may be implemented as follows. Let $\text{conf}^0(x,y)$, $\text{conf}^1(x,y)$ and $\text{conf}^2(x,y)$ denote the saturation confidence maps, as defined in (19), of the reference frame and the two enhancement frames, respectively. Also, let $C^0(x,y)$, $C^1(x,y)$ and $C^2(x,y)$ be the associated color fusion maps, where one defines $C^0(x,y)=1$ $\forall (x,y)$ in the case of the reference frame. Finally, let $\{a^k(x, y), b^k(x, y)\}$, $k \in \{0,1,2\}$ be the chromaticity channels of the reference and two enhancement frames.

To formulate the fused chromaticity $\{a(x, y), b(x, y)\}$ at some location $(x, y)$, one first sorts the confidence values at that location in decreasing order, such that $\text{conf}^{i_0}(x, y) \geq \text{conf}^{i_1}(x,y) \geq \text{conf}^{i_2}(x, y)$, with $i_0, i_1, i_2 \in \{0,1,2\}$ the respective frame indices (note that in this we are generalizing the process of selecting the frame with maximum confidence, as discussed). The fused result is given as a recursive convex combination of the color inputs, with the linear weights taken from the color fusion maps:

$$a(x,y) = C^{i_0} a^{i_0} + (1-C^{i_0})(C^{i_1} a^{i_1} + (1-C^{i_1}) a^{i_2})$$

$$b(x,y) = C^{i_0} b^{i_0} + (1-C^{i_0})(C^{i_1} b^{i_1} + (1-C^{i_1}) b^{i_2}) \quad (20)$$

Note that the confidence values $\text{conf}^k(x,y)$ do not explicitly participate in the computation, however they play the vital role of determining the order of the terms in the summation (they determine the indices $i_0, i_1, i_2$). The computation itself can be explained: First, assume that $C^{i_0}=1$, which means that frame $i_0$—the least saturated frame at $(x, y)$—is assigned a color fusion weight of 1. In this case, the computation reduces to taking the color from this least saturated frame, since $(1-c^{i_0})=0$ and thus all remaining frames are ignored. Therefore, an property of this process is that it reduces to the optimal (basic) process whenever the color fusion weights are all 1.

When $C^{i_0}<1$, part of the color information from frame $i_0$ is used. In the limit of $C^{i_0}=0$, the system may completely ignore this frame, even if its confidence is high—this could occur, for instance, when a mis-match is detected at that location. Finally, for $0<C^{i_0}<1$, computation (20) means that the fused result at $(x,y)$ is the recursive fusion of all frames except $i_0$, subsequently combined with the information from $i_0$ according to its associated weight.

Another property of the described process is that it easily generalizes to an arbitrary number of frames. The process may begin with the color information from the least saturated frame, and incrementally adds color from the more saturated frames—stopping when it reaches the first frame with an associated color fusion weight of 1. All frames which are more saturated than this one will be excluded from the fusion, to avoid unnecessary degradation of the result.

Computation of the Color Fusion Maps

Computing the color fusion map of an enhancement frame may begin with its smooth border map. Such a map contains zeros outside the frame's defined region and ones within its defined region, with a gradual transition from 0 to 1 on the inner side of its boundary. The transition from 0 to 1 extends a predefined distance. This map may be strictly zero beyond the defined area of the frame, so as not to introduce errors in the fusion process, and thus the smooth transition occurs entirely within the frame's defined region.

Computing this map can be done using the Euclidean distance transform, which accepts a binary map as input and outputs a map containing the Euclidean distance between each pixel and its nearest non-zero. The Euclidean distance transform can be efficiently computed in linear time, and using this transform, the computation of the smooth border map becomes straightforward, see Algorithm 4.

Once the smooth border maps of the enhancement frames have been computed, the system may normalize them so that at every location is covered by at least one enhancement frame, the larger among the two maps has a value of 1. This may be done by dividing the two border maps pixel-wise by the maximum of the two maps, wherever at least one of them is defined. This normalization process produces the initial color fusion maps for the enhancement frames, and ensures linear transitions between the enhancement frames in their regions of overlap.

The final color fusion maps are obtained from the initial color fusion maps, $C^1$ and $C^2$, and the mis-match maps $M^k$:

$$C^k = C^k \cdot (M^k * \sigma) \; k=1,2$$

where * denoted convolution. In other words, the computation is a pixel-wise multiplication of the initial color fusion map with a Gaussian-blurred version of the mis-match map. Blurring the mis-match map increases both the spatial and temporal smoothness of the fused result.

Image Capture and Coding

Introduction

These embodiments address capturing high (or higher) dynamic range video with (i) current (LDR) sensor technology and, in some cases, (ii) power-constrained imaging platforms, e.g. camera-phones. High dynamic range acquisition is not well addressed for this environment. Such environments may not require an (HDR) image sensor and instead acquire multiple exposures. The environment should efficiently store/transmit the data so that calculations may be offloaded from the camera platform. Additionally, an efficient representation of an acceptable video sequence that can be played back on legacy decoders is desirable.

Exemplary Embodiments

An exemplary embodiment may comprise the following elements:
1. A camera sensor module is initialized by a host processor, captures image data and transmits the image data to the processor. The image data may undergo some processing, e.g. white balancing, de-mosaicing, gamma correction or conversion to a d color space, within the camera sensor. Optionally, the camera sensor module transmits meta-data describing its configuration to the host processor.
2. The host processor compresses and stores the image data. The data is then stored or transmitted to a second device. Optionally, the meta-data is stored or transmitted to a second device.
3. The host processor continues to receive data from the sensor module, compresses and stores the image data, and optionally the meta-data is stored or transmitted to a second device.
4. Periodically, the host processor requests that the image sensor use an alternative exposure value (or an alternative set of values). The camera module transmits the resulting enhancement image data to the host processor.
5. The host processor compresses and transmits/stores the enhancement image data to the second device. Optionally, the host processor transmits/stores the meta-data describing the configuration of the image sensor to the second device. Optionally, the host processor transmits/ stores a representation of the current frame at the original exposure value to the second device.
6. The host processor then requests that the image sensor return to a previous exposure value. The image sensor transmits the image data, and the process returns to Step #2 (above).

At the decoder, a legacy second device may ignore the enhancement information and reconstruct an image sequence corresponding to the default exposure or exposure method. However, decoders on advanced second devices may extract this additional enhancement information and utilize it for enhancing the dynamic range of the original scene.

An exemplary embodiment may also comprise the following aspects:
1. A system of interleaving multiple exposures in a single, coded video bit-stream.
2. A system of capturing multiple exposures on a mobile or LDR platform, transmitting the data in a backwards compatible manner, and using advanced decoding processes to reconstruct a higher dynamic range image sequence for display. Additionally, some embodiments may comprise the aspect of performing this higher dynamic range reconstruction on a second device that is more amenable for higher power processing.
3. The use of low temporal sampling of the alternate (enhancement) exposure values to reduce bit-rate and power consumption within the mobile device.
4. The capture and transmission of camera meta-data containing meta-data from an imaging sensor. Specifically, the capture and transmission of one or more of white balance, de-mosaicing, gamma correction, exposure values, gain values, automatic exposure methods, automatic gain methods, color space conversion methods and other parameters describing processing within a camera sensor module.
5. Systems and methods for efficient coding of a sequence containing different exposures. Additionally, some embodiments comprise efficient encoding so that only one exposure value is reconstructed by a legacy decoder.

System Description

Some embodiments may comprise a camera sensor module and acquisition system. These systems comprise a standard dynamic range imaging sensor and host processor or other control interface. Some embodiments may include an encoding system. This system represents the image data efficiently. Additionally, this system is responsible for storing the image sequence so that enhancement exposures are not decodable and viewable by legacy decoders, while an image sequence corresponding to a single exposure value (or method) and with suitable quality is output by a legacy decoder. Some embodiments may comprise a high dynamic range reconstruction system that leverages the enhancement exposures to produce higher dynamic range images.

Described herein includes the compression and representation of an image sequence containing sets of image frames corresponding to different exposure values or automatic exposure calculation methods. For example, the sequence of images appearing in FIG. 1 provides a representation of the signal input. In FIG. 1, a first series of frames 50, 54, 56 and 60 are captured using a first exposure configuration or exposure calculation method. Additionally, a second series of frames 52 and 58 may be captured using a second exposure configuration or exposure calculation method.

In some embodiments, an encoding system may begin by encoding the frames corresponding to a default (first) exposure value or exposure calculation method using a video coding system supported by legacy devices. Example legacy systems include H.264/AVC, MPEG-2 and MPEG-4 as well as others. The output of this process may be referred to as the legacy bit-stream 62, which is illustrated in FIG. 6.

Figure 6:
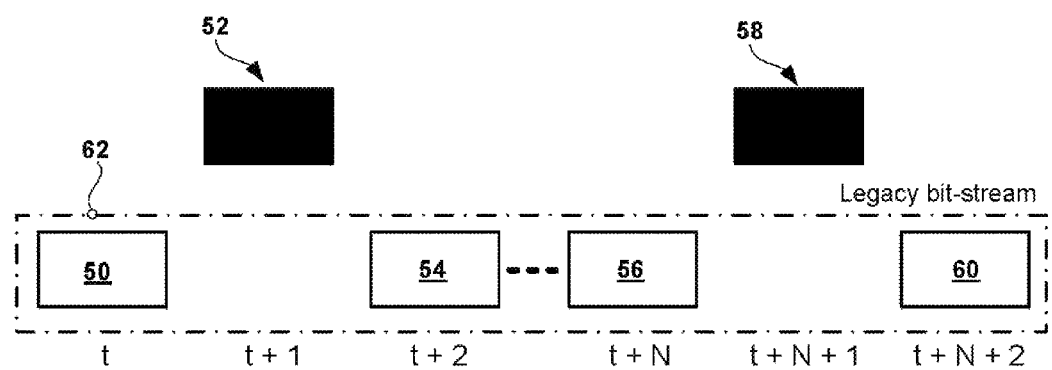
FIG. 6 is a diagram showing an exemplary legacy bitstream.
Figure 7:
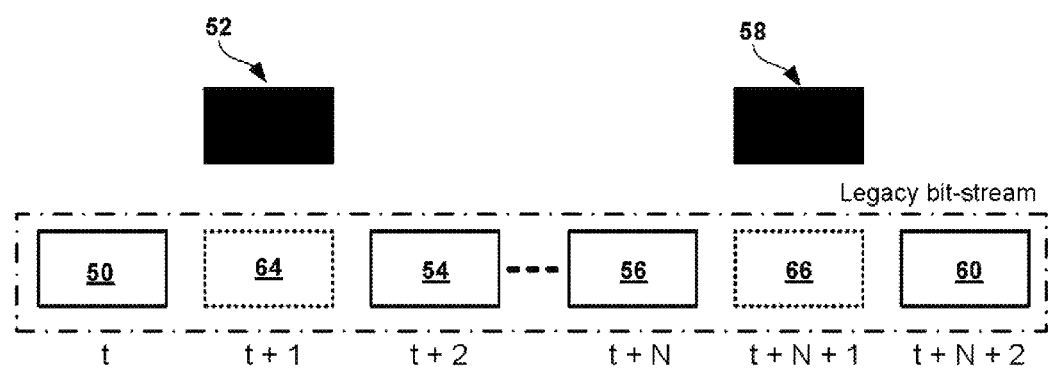
FIG. 7 is a diagram showing an exemplary temporal interpolation process and associated frames.

In FIG. 6, the legacy bit-stream 62 does not contain image data for time locations (e.g. t+1 and t+N+1) corresponding to the alternative (second) exposure. This is allowed in many video coding systems and decoders may optionally perform temporal interpolation to synthesize these frames. However, in alternative embodiments, this temporal interpolation process may be performed during encoding. In some embodiments, an encoding process that inserts a "skip frame" in the bit-stream at these time instances. A skip frame may be defined as a bit-stream instruction that copies the image intensity values from a previous time instance to a current time instance. Of course, other methods for temporal interpolation may also be used. These include the process of interpolating a frame and then coding it explicitly, as well as the process of using bit-stream information, e.g. motion vectors, coding modes, etc., from neighboring temporal frames to construct an interpolated frame. An exemplary encoding system incorporating temporal interpolation is shown in FIG. 7. Interpolated frames 64 and 66 correspond to the time slots when enhancement frames 52 and 58 were captured, respectively.

Having considered the encoding of the legacy bit-stream 62, one now considers the representation of the enhancement data 52 & 58. In some embodiments, the data is encoded so that it may be ignored by legacy decoders. This can be achieved by creating an enhancement bit-stream. In some embodiments, the enhancement and legacy bit-streams may then be interleaved using user-data markers, alternative NAL unit values or other methods. Alternatively, the bit-streams may be multiplexed as separate bit-streams within a larger transport container. Of course, the bit-streams may also be transmitted or stored separately.

Figure 8:
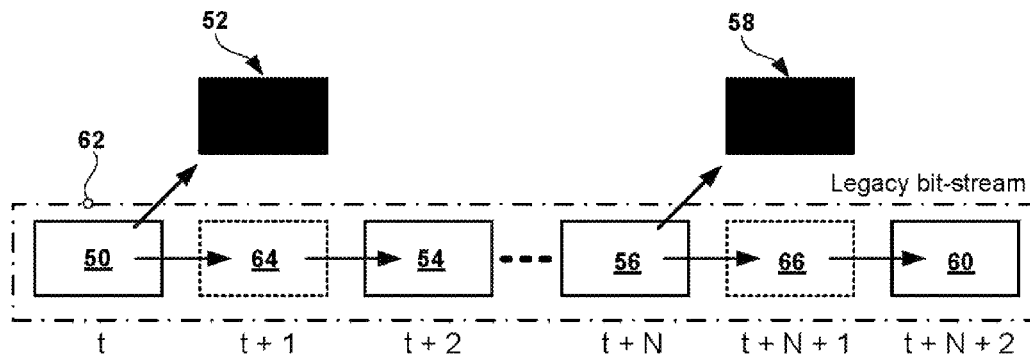
FIG. 8 is a diagram showing an exemplary prediction structure.
Figure 9:
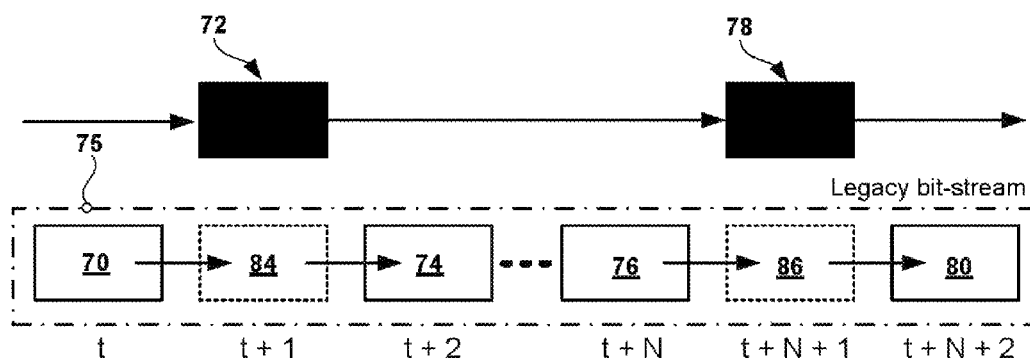
FIG. 9 is a diagram showing an exemplary alternative prediction structure.

Efficient coding of the enhancement layer data provides better performance. In some embodiments, one encodes the enhancement frames without prediction from other time instances or the legacy bit-stream. Unfortunately, this is inefficient in terms of video coding efficiency. In another set of embodiments, illustrated in FIG. 8, one encodes the enhancement frames 52 & 58 using image frames 50 & 56 in the legacy bit-stream as reference frames. In a further set of embodiments, one encodes the enhancement frames 72 & 78 using frames (not shown) in the enhancement bit-stream as reference frames as shown in FIG. 9. Note the legacy bit stream 75 comprises the default exposure frames 70, 74, 76 & 80 as well as interpolated frames 84 & 86.

In further embodiments, both inter-frame and inter-bit-stream prediction may be used. In some of these embodiments, a mapping process that projects frames captured at one exposure value to frames captured at a second exposure value may be enabled. This technique may include a weighted prediction technique. These embodiments, illustrated in FIG. 10, may use an exposure compensation process to predict or otherwise generate exposure compensated frames 102 & 108 from which enhancement frames 92 & 98 may be predicted. Other enhancement frames may also be used to predict 105 enhancement frames 92 & 98. Again, the legacy bit stream 95 comprises the default exposure frames 90, 94, 96 & 100 as well as interpolated frames 104 & 106.

Figure 10:
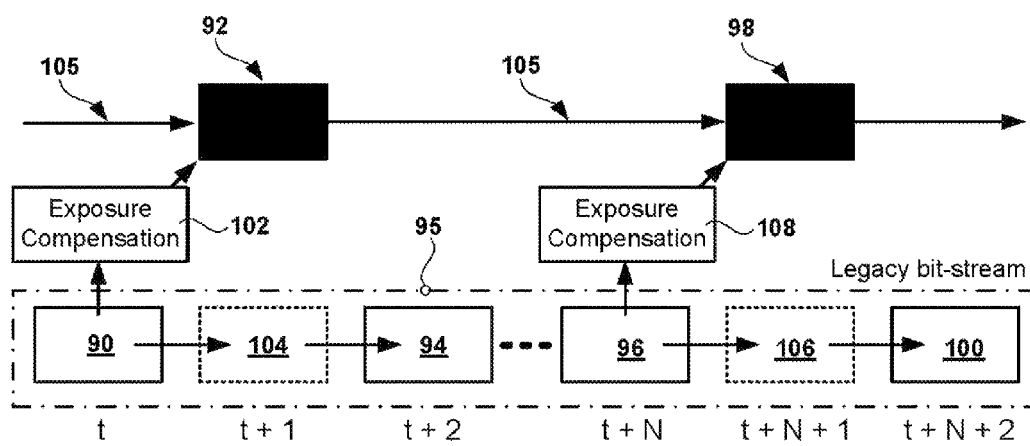
FIG. 10 is a diagram showing an exemplary prediction structure with exposure compensation.

Using these embodiments described in relation to FIG. 10, a legacy decoder may decode the legacy bit-stream 95 and output a video sequence corresponding to a first exposure value. A decoder may decode the enhancement bit-stream to output a video sequence corresponding to the image sequence in FIG. 1. Some embodiments may comprise additional picture buffers for storing enhancement frames for future prediction. Additionally, in some embodiments, a decoder able to decode the enhancement bit-stream will not reconstruct the frames appearing in the legacy bit-stream that correspond to the time instances of enhancement frames.

Metadata-Based Embodiments

Introduction

Mobile video cameras, such as those in cell phones, typically have low dynamic range, and are not suitable to capture the full dynamic range of the real world. Consumers typically take videos in arbitrary and time varying lighting conditions, and this requires a camera to vary its exposure to compensate for the low dynamic range. These exposure variations can be useful for improving image quality. Additionally, these exposure variations can be useful for extracting larger dynamic range representations at a display device. Unfortunately though, these dynamic range variations reduce coding efficiency and result in low video quality under limited bandwidth. This ultimately degrades image quality and makes it infeasible to recover higher dynamic range representations of the image sequence.

Weighted prediction is an existing approach that can efficiently code sequence with exposure variations. Weighted prediction is an internal tool of a video codec. It works by scaling the reference frame and reducing the prediction error, and hence improving the video coding efficiency. However, weighted prediction has two significant drawbacks: (1) it not allowed in the baseline profiles of the video coding standards that are typically employed for mobile encoding and (2) the computational load for exploiting weighted prediction is typically high.

Summary

Embodiments may include a video coding system that introduces pre-processing and post-processing steps by utilizing camera sensor metadata to reduce the prediction error among frames, and hence improve the coding efficiency. Unlike weighted prediction, these methods are suitable for any profiles of a video codec.

Some exemplary embodiments comprise the following steps:

Obtain camera sensor metadata, such as exposure;
Perform exposure compensation on video if necessary;
Encode this compensated sequence;
Transmit the sensor metadata info to decoder for inverse compensation use; and
At the decoder side, convert back into the original exposure.

Embodiments may utilize camera sensor metadata information to perform pre-processing and post-processing for exposure compensation. These embodiments obviate the need to change the codec to enable processing.

Detailed Embodiments

When using a typical consumer video capturing device, such as a cell phone video camera, the exposure variation affects the quality of coded video. Embodiments utilize the camera sensor data to improve the coding efficiency, and improve the quality of coded video.

Figure 11A:
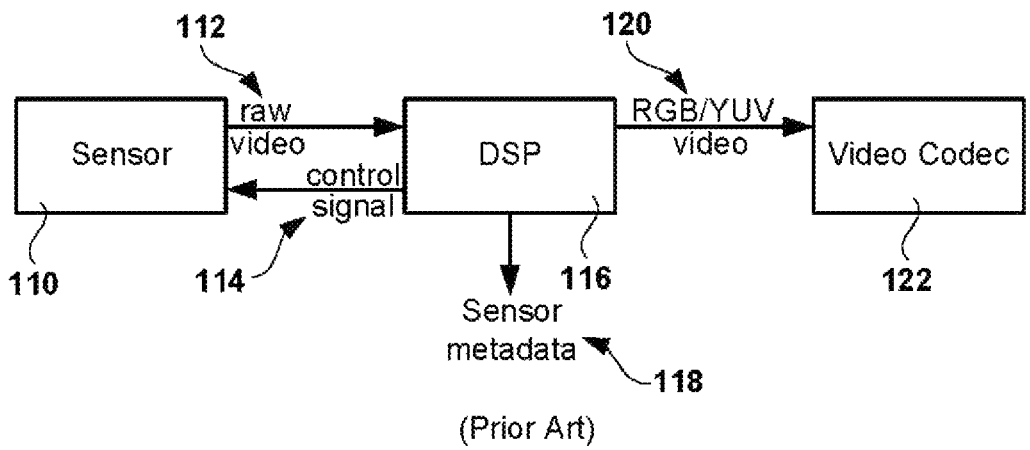
FIG. 11A is a diagram showing a typical video capture device.

As shown in FIG. 11A, a typical video capture device comprises a sensor 110, a signal processing unit (DSP) 116, and a video codec 122. The camera sensor 110 captures raw video data 112 and passes it to the DSP 116. The DSP 116 processes the raw video data and outputs 120 the video in RGB, YUV or another format. The DSP may also provide control signals 114 to the sensor 110. Typical functions of the DSP 116 include focus, exposure control, white balance, zoom/pan/tilt, flicker control, etc. Camera sensor metadata 118, comprising exposure (shutter speed, aperture, and gain), focus, flicker, white balance etc. are available by reading the registers from the DSP 116. These sensor metadata 118 are not used for video coding.

Video Coding System with Exposure Compensation

Figure 11B:
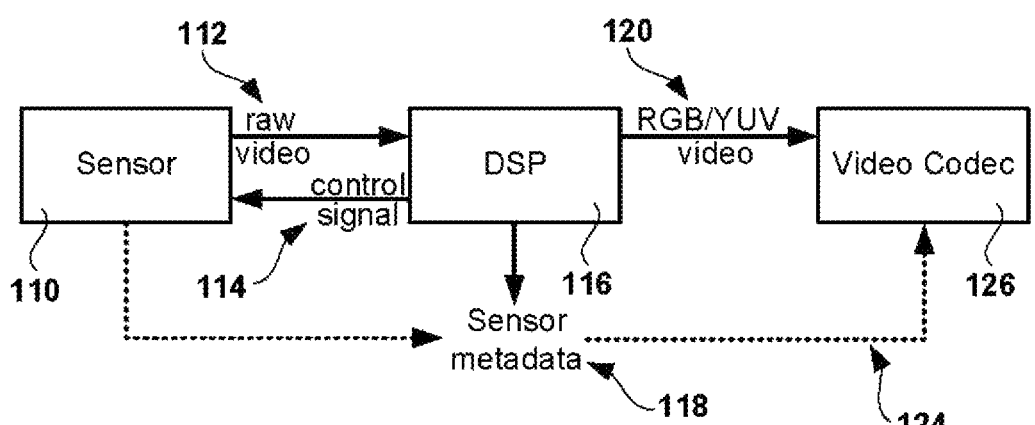
FIG. 11B is a diagram showing an exemplary video capture device with metadata enhancement.

A typical video capture device as shown in FIG. 11B, comprises a sensor 110, a signal processing unit (DSP) 116, and a video codec 122. The camera sensor 110 captures raw video data 112 and passes it to the DSP 116. The DSP 116 processes the raw video data and outputs 120 the video in RGB, YUV or another format. The DSP may also provide control signals 114 to the sensor 110. Typical functions of the DSP 116 include focus, exposure control, white balance, zoom/pan/tilt, flicker control, etc. Camera sensor metadata 118, comprising exposure (shutter speed, aperture, and gain), focus, flicker, white balance etc. are available by reading the registers from the DSP 116. Camera sensor metadata may alternatively or additionally be obtained directly from the sensor 110. The sensor metadata 118 are passed 124 to the video codec 126 for use in video coding.

Figure 12:
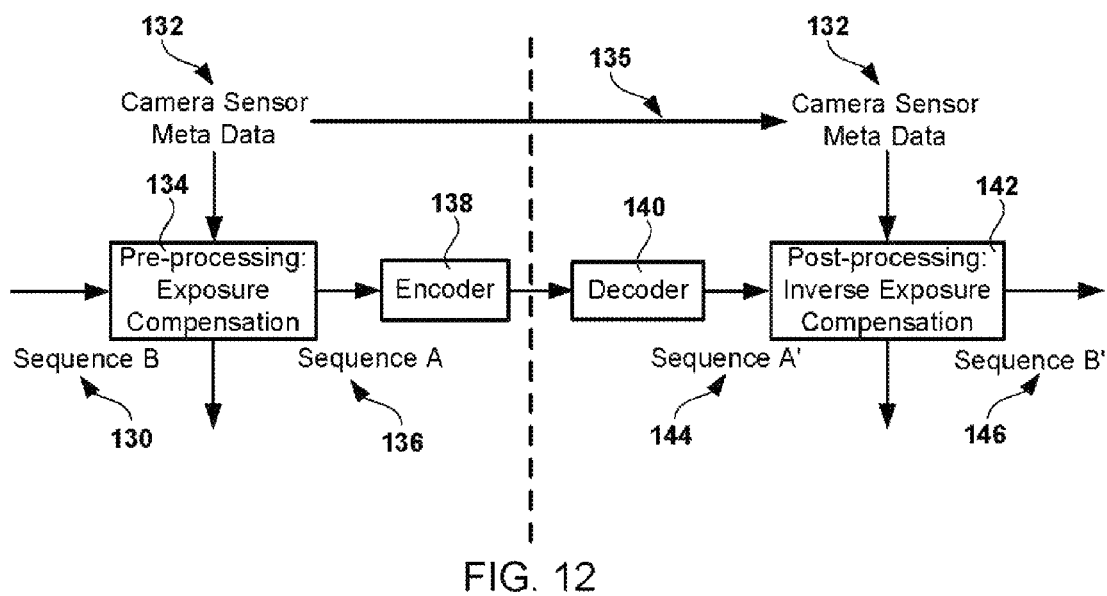
FIG. 12 is a diagram showing an exemplary video coding system with exposure compensation.

The coding system may utilize the camera sensor metadata in the video codec to improve the coding efficiency. These embodiments may comprise a simple pre-processing and a post-processing step for exposure compensation. FIG. 12 shows a diagram of an exemplary system. A video sequence, sequence B 130, is captured with a video sensor and passed to a pre-processing exposure compensation process 134. Sensor metadata is also passed to the exposure compensation process 134. Using the sensor metadata 132, sequence B is pre-processed to obtain sequence A 136. Sequence A 136 is sent to an encoder 138 for typical encoding. The encoded sequence A is then received at a decoder 140 and decoded, thereby creating decoded sequence A' 144, which may vary from sequence A due to quantization error or other effects. Sensor metadata 132 is also passed 135 to the decoder side and received at a post-processing inverse exposure compensation process 142, which also receives sequence A' 144 from the decoder 140. Post-processing inverse exposure compensation process 142 uses the sensor metadata to determine compensation characteristics and performs an inverse exposure compensation, thereby yielding Sequence B' 146.

An exemplary embodiment may be described with following steps:

1. Obtain camera sensor metadata 132, such as exposure;
2. Perform exposure compensation 134 on video if necessary; i.e. Convert a sequence with exposure variation (B) to one with exposure variation A
3. Encode this compensated sequence A 138;
4. Transmit the sensor metadata info 135 to decoder for inverse compensation use;
5. At the decoder side, Convert 142 the coded sequence A' back to original exposure B'

By performing the exposure compensation, one reduces the difference between frames caused by exposure variations. This will reduce the frame prediction error later in the video encoding, and therefore improve the coding efficiency. Note that, in these exemplary embodiments, during step (2) and (4), the exposure compensation is performed in linear space. This means that if the accessible video data is already gamma corrected, it should be converted back to linear space first before exposure compensation. After the compensation, one converts it to the usual gamma corrected space for coding or viewing.

A typical gamma conversion and inverse gamma conversion are given by Eq. (21) and (22). The parameters should be known by the camera DSP unit.

$$y_g = 255 * (y_l/255)^\gamma \quad (21)$$

$$y_l = 255 * (y_g/255)^{1/\gamma} \quad (22)$$

Exposure compensation and inverse exposure compensation can be expressed by Eq. (23) and (24)=

$$y_m = y_l * \text{factor} \quad (23)$$

$$y_m = y_l / \text{factor} \quad (24)$$

Here, factor is determined by camera exposure sensor data such as aperture, shutter speed and gain. Proper scaling may be included in the factor to prevent data out of range.

The goal of exposure compensation is to adjust the captured luminance as if both frames were captured by the same reference exposure, i.e. same aperture, shutter speed and gain. Accordingly, the captured luminance by a sensor is proportional to the shutter speed, inverse proportional to the square of aperture (in the unit of fstop), and proportional to gain. Therefore the factor can be expressed as:

$$\text{factor} = (\text{shutter\_speed}_{ref}/\text{shutter\_speed}) * (\text{fstop}^2/\text{fstop}_{ref}^2) * (\text{gain}_{ref}/\text{gain})$$

Here the factor is simply determined by the camera sensor metadata, no power-consuming frame matching technique is required. Of course, under the same principle, more complex pre-processing algorithms can also be used to improve the pre-processing and reduce the prediction error during coding.

To reconstruct the image sequence, one transmits 135 the camera meta-data from the encoder 138 to the decoder 140. Some embodiments may employ several mechanisms for accomplishing this. In one realization, the exposure and other camera meta-data values are transmitted as user data within a bit-stream. In a second realization, the exposure and other camera meta-data are transmitted implicitly with tone mapping curves. These curves are constructed at the encoder and instruct the decoder how to map decoded intensity values to output intensity values. The tone mapping curves are then transmitted to the decoder. In one realization, the tone mapping SEI message, as defined in the H.264/AVC standard, is employed.

Weighted Prediction Embodiments

Introduction

Weighted prediction has two significant drawbacks for mobile applications: (1) it is not currently allowed in the video coding profiles typically employed for mobile encoding and (2) the computational load for exploiting weighted prediction is typically high, due to the fact that state-of-the-art approaches perform multi-pass encoding and compare the rate-distortion (RD) cost of weighted prediction against the non-weighted prediction. This multi-pass encoding requires additional processing power, increased memory bandwidth, and higher power consumption.

The embodiments described herein are adapted to a scenario wherein weighted prediction is allowed by the video codec. In this case, the major challenge for mobile acquisition is the increased processing required to exploit the weighted prediction functionality. These embodiments comprise an efficient method for determining weighted prediction parameters. These methods may utilize camera sensor metadata to determine the parameters. It should be understood, that some of these methods do not require a change in video coding systems that support weighted prediction coding.

These embodiments facilitate the efficient selection of weighted prediction parameters through the use of camera metadata. The techniques benefit scenarios that experience variations in video brightness due to camera exposure change. An exemplary method comprises the following steps:
(a) obtain camera sensor metadata;
(b) if the camera exposure value changes between frames and exceeds a threshold, enable the weighted prediction coding tools, and
(c) determine the weighted prediction parameters from the camera metadata.

These embodiments utilize camera sensor metadata information to enable and control the weighted prediction process.

Exemplary Embodiments

The process of weighted prediction operates on the values used to predict a current frame from a reference frame. Weighted prediction may be realized by applying a multiplicative weighting factor and an additive offset to the reference frame prior to motion compensation. The goal is to reduce the motion compensated prediction error between the current and reference frames, and it is expressed as $$p_{pred}(x) = w * p_{ref}(x') + o \qquad (25)$$

where $p_{pred}(x)$ is the predicted pixel at the coordinate x in the current picture, $p_{ref}(x')$ is the pixel at the motion compensated position x' in the reference picture, and w and o are the weighting factor and offset, respectively. Selection of these parameters is accomplished at the encoder, which must determine whether to use weighted prediction or not. It also determines the weighting parameters.

These embodiments comprise a weighted prediction estimation method that uses camera sensor metadata. This addresses the problem of video brightness variations caused by camera exposure changes, which is one of the cases where weighted prediction is useful during mobile acquisition.

One begins by establishing a model of how the brightness value of the acquired image is related to the exposure value of a camera. The exposure value of a camera is controlled by a combination of shutter speed and lens aperture. Shutter speed controls how long the sensor is exposed to light, while the lens aperture controls how much of the light passes through a lens. The brightness value (BV) of an acquired image is proportional to the amount of light that the sensor is exposed to, and therefore is proportional to the camera exposure value. Other factors that can affect the brightness value of the final acquired image include gain and gamma correction. As an example, one can model the brightness value (BV) as a combination of shutter speed, gain, aperture (in the unit of f-stop) and gamma ($\lambda$). This model is expressed as Eq. (26). If a camera has other image processing units or restrictions that can affect the acquired image brightness, those may be taken into account in the model also. In general, this metadata is known from the camera, and it can be used to monitor brightness value changes and also to control weighted prediction in the encoder.

$$BV \propto (shutter\_speed * gain / fstop^2)^\lambda \qquad (26)$$

Weighting parameters can be determined from the ratio of the brightness values of the current frame and the reference frame.

$$weight = \frac{BV_{curr}}{BV_{ref}} \text{ and offset} = 0 \qquad (27)$$

In these embodiments, a fast weighted prediction algorithm works as follows:
Obtain camera sensor metadata (exposure etc.) of the reference and the current frames
Calculate the change of brightness values as in Eq. (26)
If the change of brightness value exceeds a threshold, make the encoder choose weighted prediction.
Determine weighting parameters from the exposure values as in Eq. (27)

The creation of high dynamic range images may include the use of one or more different enhancement techniques. As previously described, the creation of a high dynamic range sequence of images may be based upon the capture of multiple different exposures of the same scene. Also as previously described, the fusing of the different exposures together may be used to create the sequence of high dynamic range images. Further, the tone map of the high dynamic range image may be modified to be more suitable for a non-high dynamic range display. Moreover, the different exposures may be acquired in a manner that is not temporally the same.

Figure 13:
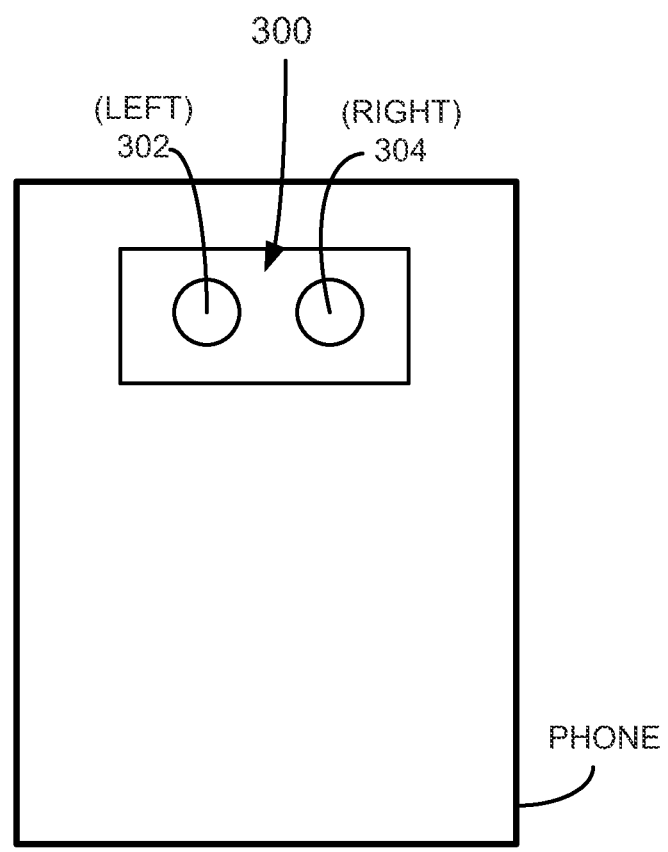
FIG. 13 illustrates a stereoscopic image capture system.

Referring to FIG. 13, a three dimensional camera 300 for mobile and non-mobile devices are capable of capturing images from a pair of imaging devices 302, 304 to create a three dimensional image on a display device. A three dimensional image is generally composed of two views taken using two cameras 302, 304 that simultaneously (or temporally offset) obtain separate images for the left eye and right eye, respectively. Consequently, the associated three dimensional processing may apply image processing to the two images, for example, to adjust color, to correct positioning, and/or to account for temporal shifts, between the image from the two imaging devices. For example, the processing may further include synchronization of the timing of the video signals, and optical axis processing to adjust for appropriate positioning. Other processing techniques may likewise be applied, as desired.

Figure 14:
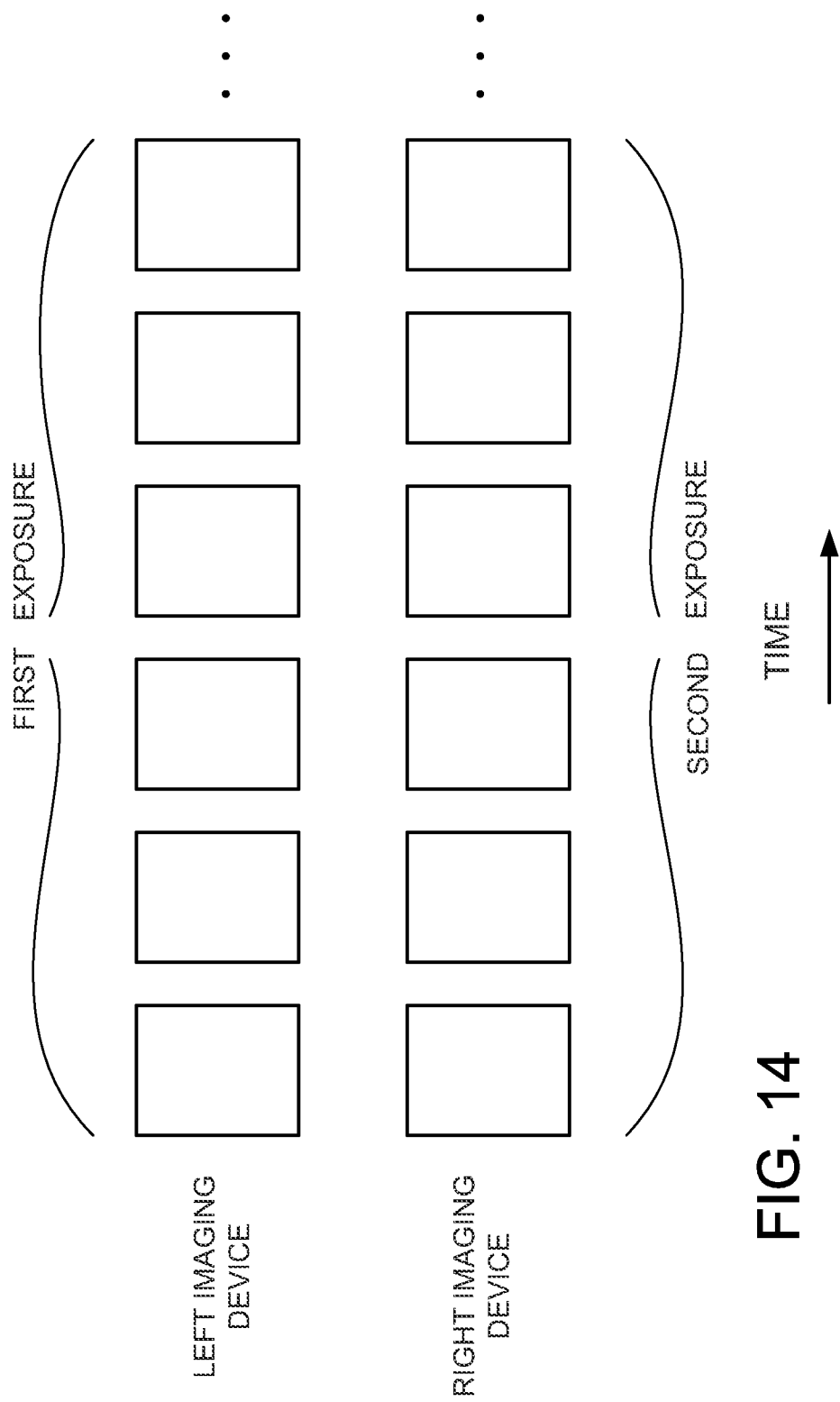
FIG. 14 illustrates left and right image sequence acquisition.
Figure 15:
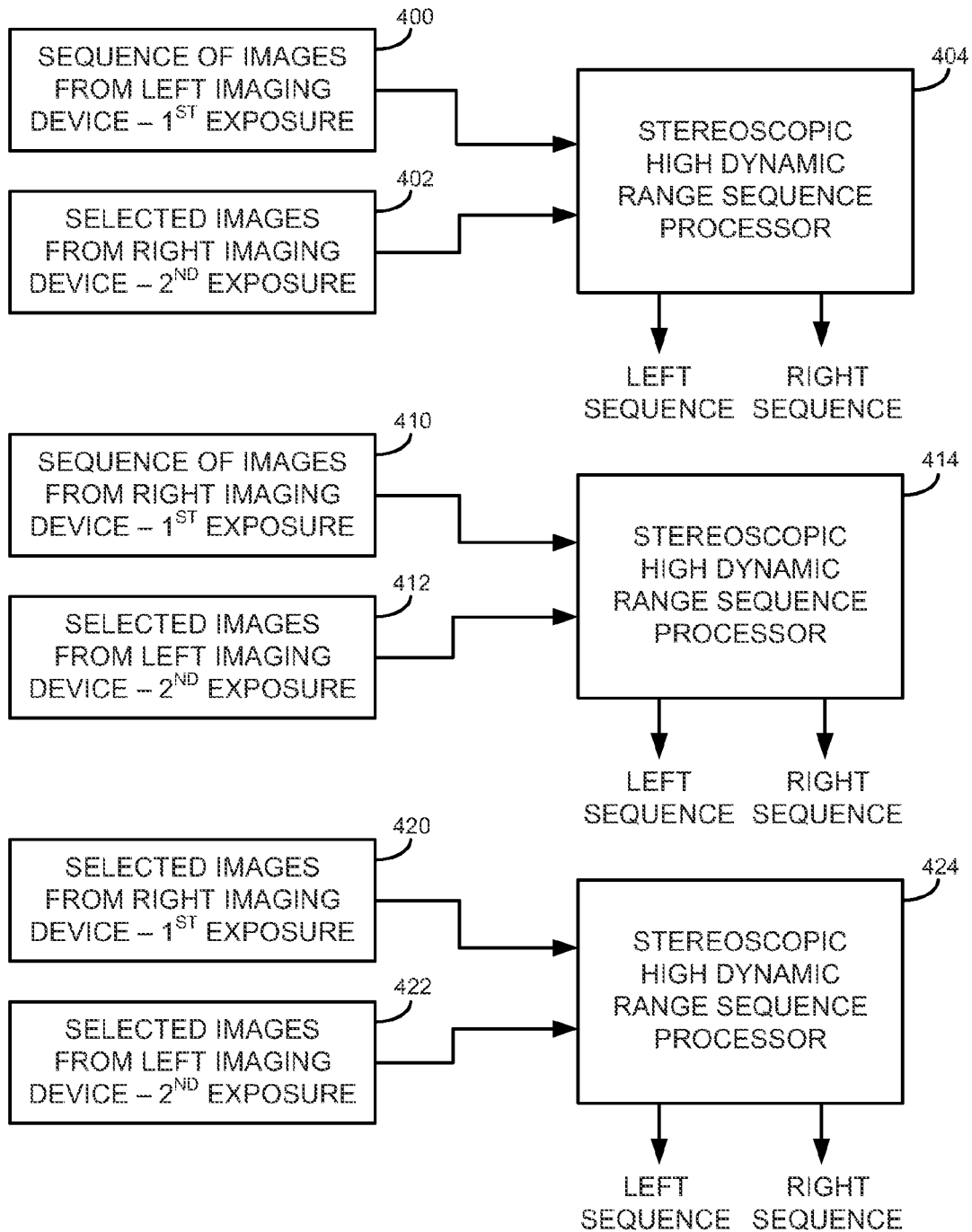
FIG. 15 illustrates left and right image sequence processing.

Referring to FIG. 14, the three dimensional camera receives a series of images from the left imaging device having a first exposure, and receives a simultaneous series (e.g., obtained during the same elapsed time period) of images from the right imaging device having a second exposure which is different from the first exposure. An exemplary image time capture and exposure sequence is also illustrated for the three dimensional camera. Preferably, the left imaging device and the right imaging device have an imaging angle between them of the scene of less than 10 degrees. Referring to FIG. 15, based upon the captured image sequence from the left imaging device 400, together with selected captured images from the right imaging device 402, the aforementioned techniques may be used to create a high dynamic range image sequence for the left imaging device 404. Also, based upon the captured image sequence from the right imaging device 410, together with selected captured images from the left imaging device 412, the aforementioned techniques may be used to create a high dynamic range image sequence for the right imaging device 414. Further, based upon selected captured images of the sequence from the left imaging device 420, together with selected captured images of the sequence from the right imaging device 422, a high dynamic range image sequence for the three dimensional camera may be determined that is representative of a viewpoint between the right and the left imaging devices 424. In general, the captured image sequence may include all, or less than all, of the available images. In general, the selected captured images may include all, or less than all, of the available images. Also, as a general matter the output of the high dynamic range process may be a single high dynamic range sequence of images from a single viewpoint.

Figure 16:
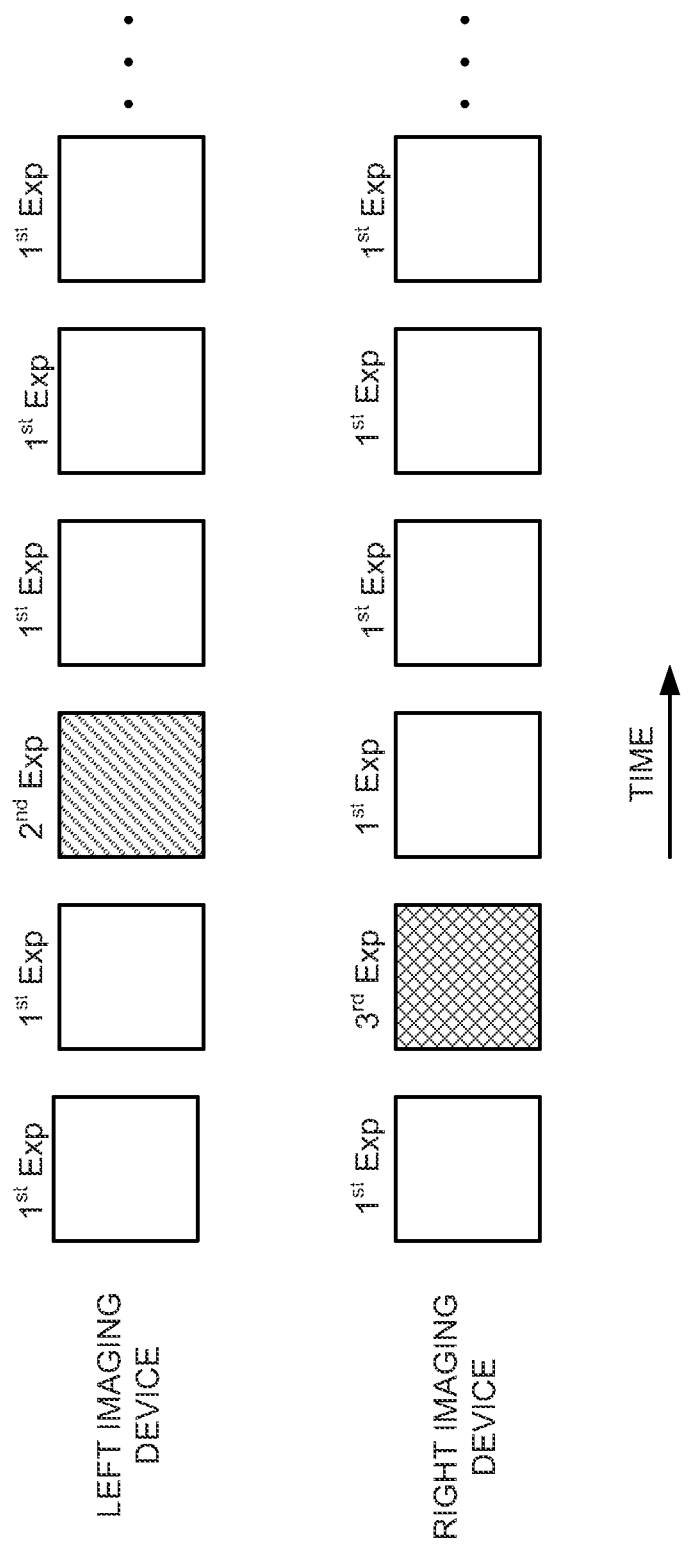
FIG. 16 illustrates another left and right image sequence acquisition.

Referring to FIG. 16, the three dimensional camera may receive a series of images from the left imaging device having a first exposure, and receives a simultaneous series (e.g., obtained during the same elapsed time period) of images from the right imaging device having the same exposure. In order to provide additional information from which to create a sequence of high dynamic range images, the right imaging device and/or the left imaging device may selectively modify its exposure which may be used for the other sequence. An exemplary image time capture and exposure sequence is also illustrated for the three dimensional camera. Preferably, the left imaging device and the right imaging device have an imaging angle between them of the scene of less than 10 degrees. Referring again to FIG. 15, based upon the captured image sequence from the left imaging device 400, together with selected captured images from the right imaging device having a different exposure 402, the aforementioned techniques may be used to create a high dynamic range image sequence for the left imaging device 404. In addition, images from the right sequence and/or the left sequence may be used to replace the image obtained with a different exposure for the right sequence of images. Also, based upon the captured image sequence from the right imaging device 410, together with selected captured images from the left imaging device having a different exposure 412, the aforementioned techniques may be used to create a high dynamic range image sequence for the right imaging device 414. In addition, images from the right sequence and/or the left sequence may be used to replace the image obtained with a different exposure for the left sequence of images. Further, based upon selected captured images of the sequence from the left imaging device 420, together with selected captured images of the sequence from the right imaging device 422, some of which have different exposures, a high dynamic range image sequence for the three dimensional camera may be determined that is representative of a viewpoint between the right and the left imaging devices 424. In addition, images from the right sequence and/or the left sequence may be used to replace images obtained with different exposures for either sequence of images. Depending on the processing used, the sequence of images from the left imaging device may have a high dynamic range, and the sequence of images from the right imaging device may have a high dynamic range, while also replacing selected images having different exposures.

Figure 17:
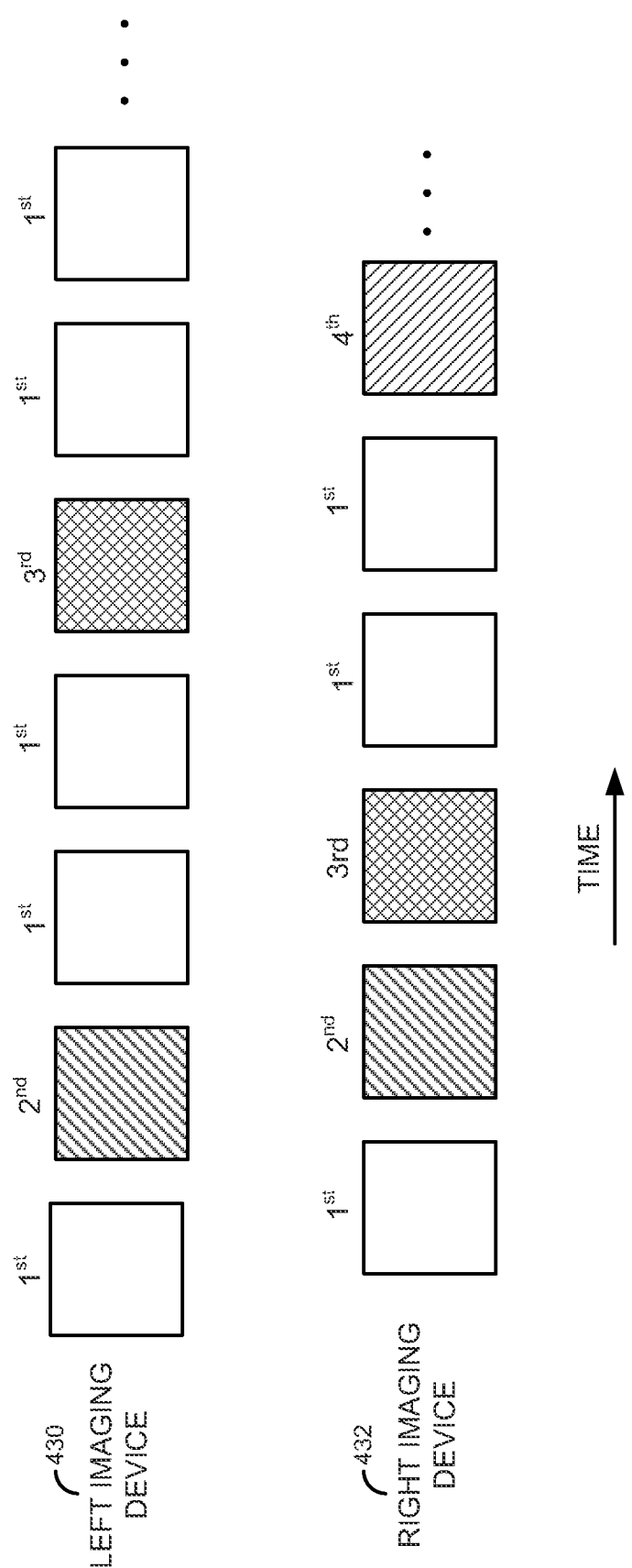
FIG. 17 illustrates a further left and right image sequence acquisition.

Referring to FIG. 17, the three dimensional camera may receives a series of images from the left imaging device having a first exposure, and receives a series of images from the right imaging device having the same exposures and/or different exposures. The timing of the acquisition of the images from the left imaging device and the right imaging device may be temporally spaced in order to reduce the computational complexity of the system. In order to provide additional information from which to create a sequence of high dynamic range images, the right imaging device and/or the left imaging device may modify selectively its exposure, as desired. An exemplary image time capture and exposure sequence is also illustrated for the three dimensional camera. Preferably, the left imaging device and the right imaging device have an imaging angle between them of the scene of less than 10 degrees. Referring again to FIG. 15, based upon the captured image sequence (or selected images captured thereof) from the left imaging device, together with the captured image sequence (or selected images captured thereof) from the right imaging device at least some of which having a different exposure, the aforementioned techniques may be used to create a high dynamic range image sequence for the left imaging device and/or the right imaging device and/or a viewpoint representative of a viewpoint between the right and left imaging devices. In general, it is desirable that the majority of the images of the first sequence of images have the same exposure, and the majority of the images of the second sequence of images have the same exposure.

Figure 18:
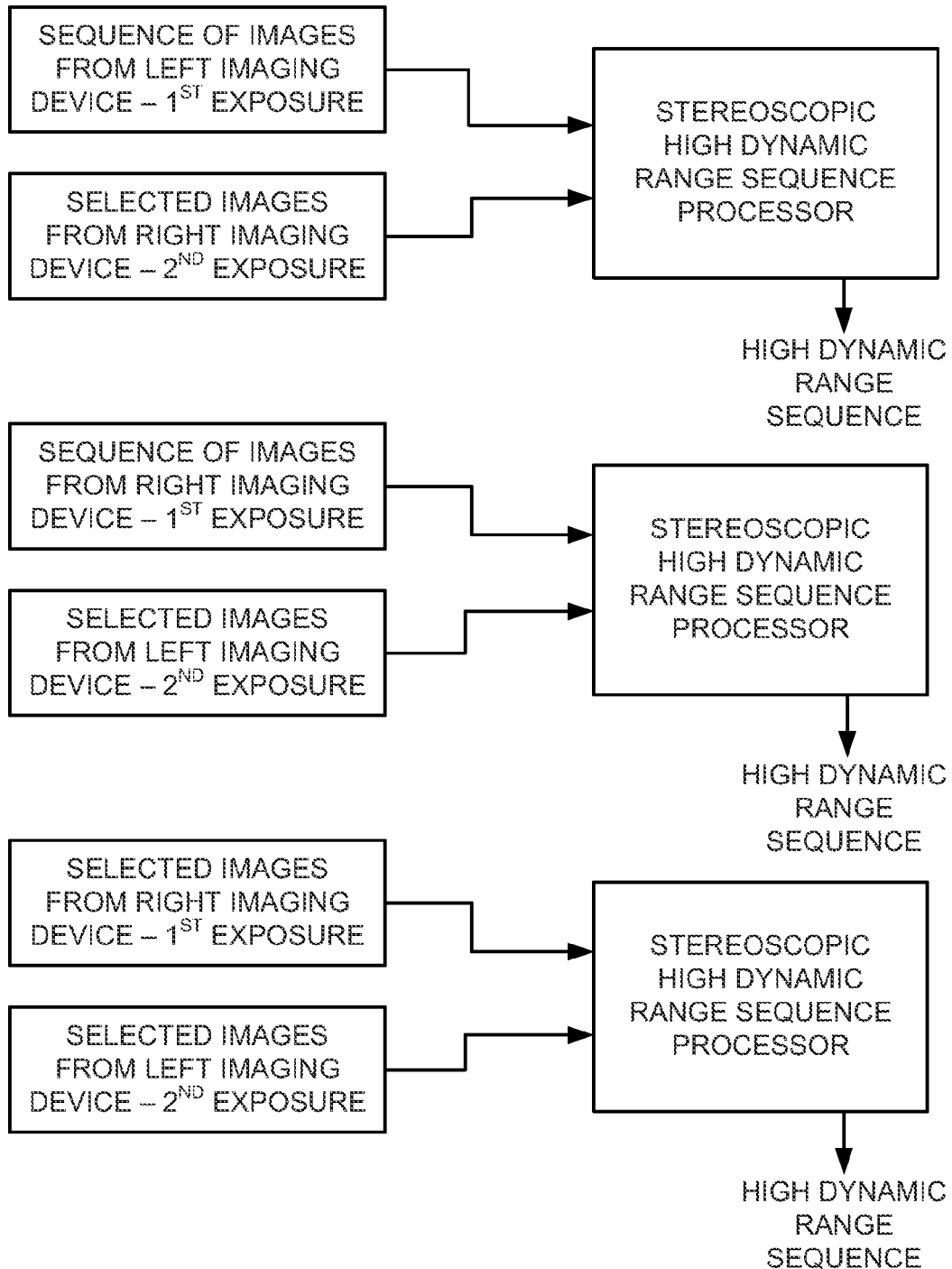
FIG. 18 illustrates left and right image sequence processing to provide a high dynamic range image sequence.

Referring to FIG. 18, based upon a captured image sequence from the left imaging device, together with selected captured images from the right imaging device, the aforementioned techniques may be used to create a high dynamic range image sequence. Also, based upon a captured image sequence from the right imaging device, together with selected captured images from the left imaging device, the aforementioned techniques may be used to create a high dynamic range image sequence. Further, based upon selected captured images of a sequence from the left imaging device, together with selected captured images of a sequence from the right imaging device, a high dynamic range image sequence for the three dimensional camera may be determined.

Figure 19:
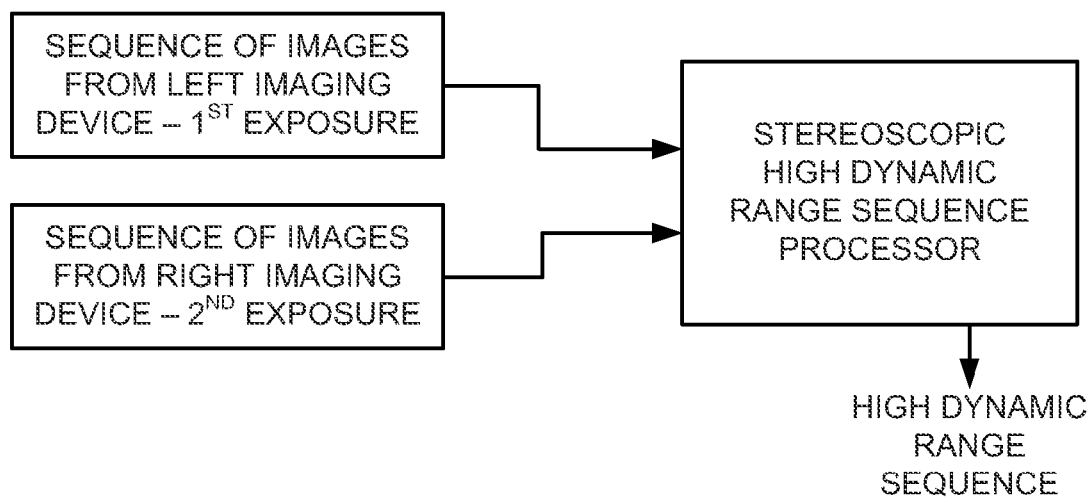
FIG. 19 illustrates another left and right image sequence processing to provide a high dynamic range image sequence.

Referring to FIG. 19, based upon a captured image sequence from the left imaging device, together with a captured image sequence from the right imaging device, the aforementioned techniques may be used to create a high dynamic range image sequence.

The terms and expressions which have been employed in the foregoing specification are used therein as terms of description and not of limitation, and there is no intention in the use of such terms and expressions of excluding equivalence of the features shown and described or portions thereof.

I claim:

1. A method for decoding a video sequence, said method comprising:
   (a) receiving a first temporal sequence of images captured by first image acquisition device of a stereoscopic pair of image acquisition devices, wherein said first sequence of images includes a first subset of images captured at an exposure different than the exposure of other images in said first set of images not in said first subset;
   (b) receiving a second temporal sequence of images captured by another image acquisition device of said stereoscopic pair of image acquisition devices, wherein said second sequence of images includes a second subset of images captured at an exposure different than the exposure of other images in said second set of images not in said second subset;
   (c) creating a high dynamic range image sequence, having a dynamic range greater than the dynamic range of said first sequence and said second sequence, by using only image from said first temporal sequence of images included in said first subset to increase the dynamic range of said second temporal sequence of images, and using only images from said second temporal sequence of images not in said second subset to increase the dynamic range of said first temporal sequence of images.

2. The method of claim 1 wherein said first image acquisition device and said second image acquisition device capture respective images having an imaging angle between them of less than 10 degrees.

3. The method of claim 1 including the step of replacing at least one image in said first subset with another image from said first temporal sequence of images not in said first subset.

4. The method of claim 1 including the step of replacing at least one image in said first subset with another image from said first temporal sequence of images not in said first subset.

5. The method of 1 wherein a majority of said first sequence of images has the same exposure and a majority of said second sequence of images has the same exposure.

6. The method of claim 1 wherein said high dynamic range sequence has a viewpoint between said first sequence of images and said second sequence of images.

7. The method of claim 1 wherein said first sequence of images and second sequence of images are temporally offset with respect to one another.

* * * * *